United States Patent
Oren et al.

Patent Number: 5,844,887
Date of Patent: Dec. 1, 1998

[54] ATM SWITCHING FABRIC

[75] Inventors: Yair Oren, Jerusalem; Eitan Doron, Tel Aviv; Albert Olier, Rishon Le'zion; Yossi Shussman, Kfar Saba; Benny Siman Toy, Rishon Le'zion, all of Israel

[73] Assignee: Scorpio Communications Ltd., Or Yehuda, Israel

[21] Appl. No.: 564,848

[22] Filed: Nov. 30, 1995

[51] Int. Cl.[6] .......................... H04L 12/56; H04Q 11/04
[52] U.S. Cl. .......................................... 370/218; 370/395
[58] Field of Search ................................. 370/395–399, 370/409, 419, 427, 217–220

[56] References Cited

U.S. PATENT DOCUMENTS

| | | | |
|---|---|---|---|
| 5,436,886 | 7/1995 | McGill | 370/16 |
| 5,509,008 | 4/1996 | Genda | 370/398 |

OTHER PUBLICATIONS

Anthony Alles, "ATM Interworking", May 1995, Cisco Systems, Inc. publication pp. 1–58.

Uyless Black, ATM: Foundation for Broadband Networks, Prentice Hall, pp. 193–195, 1995.

David E. McDysan et al., ATM: Theory and Application, McGraw-Hill, p. 299, 1995.

*Primary Examiner*—Douglas W. Olms
*Assistant Examiner*—Matthew C. Phillips
*Attorney, Agent, or Firm*—Skjerven, Morrill, MacPherson, Franklin & Friel

[57] ABSTRACT

A distributed, scalable and modular asynchronous transfer mode (ATM) switching fabric is disclosed. The switching fabric includes port interface modules for connecting physical devices to the switch fabric. The switch fabric is arranged as rows of input buses running horizontally and columns of output buses running vertically. A junction module is located at each intersection of input and output buses. A switch can be constructed having any integer number M input and output buses, each input and output bus having an associated port interface module. The switching fabric for the specific case of M=2 is presented. Junction modules buffer and store cells received from the input buses and subsequently output cells onto the output buses. A junction module only accepts cells destined for one of the two output buses connected to itself. One output module is connected to each junction module situated with the same fabric column. Output modules instruct the junction modules when to store and output a cell. They also determine the order upon which cells are output onto the output buses. Communication protocols between output modules and junction modules and between output modules and port interface modules are disclosed. A method of providing N+1 redundancy within the switch fabric is also disclosed. The addition of one spare fabric card provides the means to provide redundancy in the event one of the regularly operating fabric cards fails.

25 Claims, 12 Drawing Sheets

| WORD 0 | ROUTING TAG (31:16) |
|---|---|
| WORD 1 | ROUTING TAG (15:0) |
| WORD 2 | ATM HEADER (31:16) |
| WORD 3 | ATM HEADER (15:0) |
| WORD 4-27 | ATM PAYLOAD (48 BYTES) |

FIG.12

| 8 | 7 | 6 | 5 | 4 | 3 | 2 | 1 |
|---|---|---|---|---|---|---|---|
| SERVICE CLASS | | MC | OUTPUT BUS | | | | PORT |
| PORT (CONT.) | | | RESERVED | | | | XPND |
| RESERVED | | | | | EPD-FLAG | EPD-ENBL | C-AV |
| IN-PORT-ID | | | | | | | |

FIG.13

| 8 | 7 | 6 | 5 | 4 | 3 | 2 | 1 |
|---|---|---|---|---|---|---|---|
| SERVICE CLASS | | MC | RESERVED | OUTPUT BUS BITMAP | | | |
| OUTPUT BUS BITMAP (CONT.) | | | | | | | |
| OUTPUT BUS BITMAP (CONT.) | | | | VP-MC | EPD-FLAG | EPD-ENBL | C-AV |
| IN-PORT-ID | | | | | | | |

FIG. 14

| 8 | 7 | 6 | 5 | 4 | 3 | 2 | 1 |
|---|---|---|---|---|---|---|---|
| GFC | | RESERVED | | MC-GROUP-ID | | | |
| RESERVED | | | | MC-GROUP-ID (CONT.) | | | |
| MC-GROUP-ID (CONT.) | | | | | | | |
| PTI | | | | | | | CLP |

FIG. 15

| 8 | 7 | 6 | 5 | 4 | 3 | 2 | |
|---|---|---|---|---|---|---|---|
| \multicolumn{8}{c}{MC-GROUP-ID} |||||||||

| MC-GROUP-ID (CONT.) | VCI |
|---|---|
| VCI (CONT.) ||
| VCI (CONT.) | PTI | CLP | ions that is rapidly
ATM SWITCHING FABRIC

FIELD OF THE INVENTION

The present invention relates to a distributed, scalable and modular asynchronous transfer mode (ATM) switching fabric employing N+1 redundancy in its internal architecture and to the internal protocol used in the operation thereof.

BACKGROUND OF THE INVENTION

Asynchronous Transfer Mode (ATM) is a networking transmission and switching technology that is rapidly becoming a global broadband networking technology solution. ATM technology is beginning to play an important role in meeting the current exploding demand for bandwidth in workgroup and enterprise networks. Network bandwidth requirements have been steadily rising in the past, but have recently experienced a very sharp increase. This is due to several factors. Computers are being built today around much more powerful processors, such as the PowerPC and the Pentium. These modern processors are able to crank through huge amounts of data in a relatively short time. Today, there are many more users attached to networks: Local Area Networks (LANs), Wide Area Networks (WANs) and global networks such as the Internet. There is also, today, an increased use of client/server, data intensive imaging and multimedia applications. Networks today are more and more becoming enterprise and global in scope. In addition, modern information based enterprise applications tie together all of a company's remote sites. The virtual company is becoming a reality due to high speed backbones being put into place to link remote sites together.

In addition to integrating data, the current trend is to integrate imaging, video and voice, with each type of data having its own unique characteristics. Data transmission can be long or short and is typically not time critical. On the other hand, video requires a large bandwidth and is very isochronous (i.e. time sensitive). Voice does not require as large a bandwidth but it is time sensitive. The attributes of ATM technology include dramatically increased bandwidth, the ability to cross both LAN and WAN boundaries, and the ability to transport fundamentally different voice, data and video.

Illustrated in FIG. 1 is a an example of multiple ATM switches connected to form a network. Computers 12 are connected to a network hub 14 which in turn is connected to ATM switch 16. Network hub 14 functions to interface an ATM network to a non-ATM network, such as an Ethernet LAN, etc. Computer 12 is also directly connected to ATM switch 16. Two ATM switches are connected to WAN 18. The network illustrated in FIG. 1 might, for example, be a central office (CO), edge, enterprise or LAN/WAN network application. Edge ATM switches are located at the border or edge of a customer premises network and used to connect to the public ATM network. Typical port interfaces include STS-3 (SONET standard) and DS-3 (approximately 45 Mbps).

ATM technology is based on fixed size cells, connection orientation, hardware routing and rate independence. ATM cells have a fixed cell size of 53 bytes compared to typical LAN packets of several kilobytes. By limiting the amount of processing required to switch each cell, it is possible to implement hardware switching with its potential for much greater bandwidth. ATM cells consist of a 5 byte header and a 48 byte payload. Unlike connectionless Ethernet LANs, connection orientation requires that a connection be established between source and destination before any data can flow between them. Since connections are established only when requested by an end station, ATM switches allocate bandwidth on demand. Hardware routing, versus software routing common today, greatly reduces cell delays down to the few microsecond range. Software routing typically has delays an order of magnitude greater or more. In addition, ATM does not specify any specific rates or physical media, allowing it to scale to support a variety of user requirements.

A typical ATM switch must perform three main functions: call set-up, maintenance and tear-down; cell routing; and traffic management. A system manager within the ATM switch negotiates connection parameters during the call set-up process. At tear-down, the connections are terminated and switch resources are freed.

ATM switches manage virtual channels (VCs) and virtual paths (VPs). Identifiers indicating a particular VC and VP are known as virtual channel identifier (VCI) and virtual path identifier (VPI), respectively. Referring to FIG. 2, an ATM physical link 20 may carry one or more VPs 22, 24, 26. Each VP can be viewed as a cable that contains many wires or VCs. For example, VP3 26 contains three VCs 30, 32, 34. Every ATM switch contains a local translation table that maintains routing information, as well as new VPI/VCI values for each connection. VPI/VCI values are established for each switch during call set-up and may be reused after tear-down. This allows ATM to support very large networks while keeping the connection identifiers short enough to maintain low switch latency times. The basic operation of an ATM switch is to receive a cell across a link on a known VPI/VCI value; look up the connection value in the local translation table to determine the outgoing port (or ports) of the connection and the new VPI/VCI value of the connection on that link; and to then retransmit the cell on that outgoing link with the appropriate connection identifiers. FIG. 3, appearing in a paper from Cisco Systems, Inc., San Jose, Calif., is a schematic representation of an example of the VPs and VCs within a switch. VC1, part of VP1 36, is connected on output to VC3 of VP3 40. VC2 of VP1 36 is connected to VC4 of VP2 42. Both VC1 and VC2, part of VP4 38 on input, are connected to VC1 and VC2 of VP5 on output. Connection 38 is an example of a switched virtual path wherein the path as a whole is switched.

Another example of VP switching showing VPI/VCI value assignments is illustrated in FIG. 4. Computers 12 are connected to left and right ATM switches 16 on both ends of a network. These ATM switches are the endpoints of the established VP. Middle ATM switch 16 performs the VP switching function. A VP is established which extends the length of all three switches 16. The VC extends across all three switches 16 and computers 12. The VPI/VCI value pairs are represented within parentheses as (VPI, VCI). Each switch 16 maintains a local translation routing table which contains new VPI/VCI values for each connection. During operation, each switch 16 scans the incoming cells at its input ports, determines the output port it is to be transmitted from and changes the VPI/VCI field in the cell header in preparation for the next hop. Middle switch 16, which performs the VP switching function, does not alter the value of the VCI.

Within an ATM network there exist two fundamental types of ATM connections or circuits. A unicast circuit is a point to point circuit, having one source and one destination. A multicast circuit is a point to multipoint circuit, having one source and multiple destinations. The formats of the ATM cells for each type of circuit are identical, however, the switches maintain flags in order to identify the type of connection for each particular cell.

SUMMARY OF THE INVENTION

It is an object of the present invention to provide an improved ATM switching fabric that is distributed, scalable and modular.

Yet another object of the present invention to provide an ATM switching fabric incorporating redundancy in its internal architecture.

Another object of the present invention is to provide control protocols for communications between modules internal to the ATM switching fabric.

Therefore there is provided, in accordance with a preferred embodiment of the present invention, an asynchronous transfer mode switching fabric that includes a plurality of pairs of port interface modules wherein each pair of port interface modules includes a first and second port interface module, the first port interface module is coupled to a top input bus, the second port interface module is coupled to a bottom input bus, the plurality of pairs of port interface modules couple network transmission equipment to the switching fabric, a plurality of junction modules arranged as a matrix of N rows by N columns wherein each junction module within each row is coupled to the top input and bottom input buses, each row associated with one of the pairs of port interface modules, each junction module within each column coupled to a left output bus and a right output bus, the plurality of junction modules for receiving cells from the top and bottom input buses, queuing the cells and outputting the cells onto the left and right output buses, a plurality of output modules wherein each output module is associated with a single column, each output module coupled to all junction modules within a column to form a fabric column, the output module for managing the transmission of cells from each junction module onto the left and right output buses, and the first port interface module coupled to the left output bus, the second port interface module coupled to the right output bus, each pair of port interface modules coupled to one of said output modules, the plurality of pairs of port interface modules for interfacing the switching fabric to the network transmission equipment.

Also in accordance with a preferred embodiment of the present invention the port interface module includes a plurality of port interface controllers for managing the port interface module, each port interface controller is coupled to a memory store.

Further, in accordance with a preferred embodiment of the present invention, each junction module includes a junction controller coupled to the top and bottom input buses, left and right output buses and the output module via a dedicated control signal line, the junction controller for managing the junction module, each junction controller is coupled to a plurality of cell buffers, the plurality of cell buffers for temporarily storing the cells while the cells await transmission onto the left and right output buses.

Also, in accordance with a preferred embodiment of the present invention, each output module includes an output controller coupled to each junction module within the fabric column via a left common bus, a right common bus and a dedicated control signal line, the output controller coupled to the first port interface module via left interface lines and a left output control line, the output controller coupled to the second port interface module via right interface lines and a right output control line, the output controller for managing the output module, each output module includes a memory store coupled to the output controller.

In accordance with a preferred embodiment of the present invention, there is provided an asynchronous transfer mode switching fabric which included N port interface circuit cards wherein each port interface circuit card includes a first and a second port interface module. the first and second port interface modules for interfacing the switching fabric to and from network transmission equipment, N fabric circuit cards wherein each fabric circuit card includes N junction modules coupled to an output module, the output module for managing the transfer of cells into and out of the N junction modules, and a redundant fabric circuit card coupled to the N port interface circuit cards and the N fabric circuit cards, the redundant fabric circuit card operative upon the failure of one of the N fabric circuit cards.

Further in accordance with a preferred embodiment of the present invention, first and second port interface modules include a plurality of port interface controllers for coupling the switching fabric to network transmission equipment, each port interface controller is coupled to a memory store.

Also, in accordance with a preferred embodiment of the present invention, each junction module includes a junction controller coupled to a top and a bottom input bus and a left and a right output bus, the junction controller also is coupled to the output module via a dedicated control signal line, the junction controller for managing the transfer of cells from the top and bottom input buses to the left and right output buses, each junction controller is coupled to a plurality of cell buffers, the plurality of cell buffers for temporarily storing cells while the cells await transmission onto the left and right output buses.

Also provided in accordance with a preferred embodiment of the present invention, on each of said N fabric cards includes, the output module includes an output controller coupled to each junction module within the fabric circuit card via a left common bus, a right common bus and a dedicated control signal line, the output controller coupled to the first port interface module via left interface lines and a left output control line, the output controller coupled to the second port interface module via right interface lines and a right output control line, the output controller for scheduling the transmission of cells from each junction module to the first and second port interface modules, each output module includes a memory store coupled to the output controller.

There is also provided in accordance with a preferred embodiment of the present invention an asynchronous transfer mode switching fabric which includes a plurality of pairs of port interface modules wherein each pair of port interface modules includes a first and second port interface module, the first port interface module coupled to a top input bus, the second port interface module coupled to a bottom input bus, the plurality of pairs of port interface modules for coupling network transmission equipment to the switching fabric, a plurality of junction modules arranged as a matrix of N rows by N columns wherein each junction module within each row is coupled to the top and bottom input buses, each row associated with one of the pairs of port interface modules, each junction module within each column coupled to a left output bus and a right output bus, the plurality of junction modules for receiving cells from the top and bottom input buses, queuing the cells and outputting the cells onto the left and right output buses, a plurality of output modules wherein each output module is associated with a single column, each output module coupled to all junction modules within a column to form a fabric column, the output module for managing the transmission of cells from each junction module onto the left and right output buses, the first port interface module coupled to the left output bus, the second port interface module coupled to the right output bus, each pair of port interface modules coupled to one of the output modules, the plurality of pairs of port interface modules for interfacing the switching fabric to the network transmission equipment, and a redundant fabric column coupled to the plurality of pairs of port interface modules and the fabric columns, the redundant fabric column becoming operative upon the failure of one of the fabric columns.

Also in accordance with a preferred embodiment of the present invention, there is provided an asynchronous transfer mode switching fabric which includes a plurality of groups of port interface modules wherein each group of port interface modules includes M port interface modules, the group of port interface modules coupled to a group of M input buses. each $i^{th}$ port interface module within a group of port interface modules coupled to an $i^{th}$ input bus within the group of M input buses, the plurality of groups of port interface modules for coupling network transmission equipment to the switch fabric, a plurality of junction modules arranged as a matrix of N rows by N columns wherein each junction module within each row is coupled to one of the groups of M input buses, each row associated with one of the groups of M port interface modules, each junction module within each column coupled to one of the groups of M output buses, the plurality of junction modules for receiving cells from the group of M input buses, queuing the cells and outputting the cells onto the group of M output buses, a plurality of output modules wherein each output module is associated with a single column, each output module is coupled to all the junction modules within a column to form a fabric column, the output module for managing the transmission of cells from each junction module onto the group of M output buses, and the $i^{th}$ port interface module coupled to an $i^{th}$ output bus, each group of M port interface modules coupled to one of the output modules, the plurality of groups of port interface modules for interfacing the switching fabric to network transmission equipment.

In addition, there is provided in accordance with a preferred embodiment of the present invention an asynchronous transfer mode switching fabric which includes N port interface circuit cards wherein each port interface circuit card includes M port interface modules, each $i^{th}$ port interface module coupled to an $i^{th}$ input bus and an $i^{th}$ output bus, the M port interface modules for interfacing the switching fabric to and from network transmission equipment, N fabric circuit cards wherein each fabric circuit card includes N junction modules coupled to an output module, each junction module forming an intersection comprising one of N junction modules coupled to M input and M output buses of one of N port interface circuit cards, the output module for managing the transfer of cells into and out of the N junction modules, and a redundant fabric circuit card coupled to the N port interface circuit cards and the N fabric circuit cards, the redundant fabric circuit card operative upon the failure of one of the N fabric circuit cards.

Also, in accordance with a preferred embodiment of the present invention, there is provided a method of forming a routing tag for a unicast cell, having a cell header, for use in an asynchronous transfer mode switching fabric, including the steps of including a service class field within the routing tag related to the service class of the unicast cell, including a multicast field within the routing tag indicating whether the unicast cell is of the multicast type or unicast type, including an output bus field within the routing tag indicating which output bus the unicast cell is destined for, including a port field within the routing tag indicating which port the unicast cell is destined for, including an expand field within the routing tag indicating whether a virtual channel identifier field in the cell header should be expanded into a virtual path identifier/virtual channel identifier value, including an early packet discard enable field within the routing tag indicating whether the unicast cell belongs to a circuit for which an early packet discard mechanism is enabled, including an early packet discard flag within the routing tag indicating whether the unicast cell is eligible for discard by the early packet discard mechanism, including a valid cell field within the routing tag indicating whether the unicast cell is valid or invalid, and including an input identification field within the routing tag indicating the identity of an input port through which the unicast cell entered the switching fabric.

There is also provided in accordance with a preferred embodiment of the present invention a method of forming a routing tag for a multicast cell for use in an asynchronous transfer mode switching fabric, including the steps of including a service class field within the routing tag related to the service class of the multicast cell, including a multicast field within the routing tag indicating whether the multicast cell is of the multicast type or unicast type, including an output bus field within the routing tag indicating every output bus the multicast cell is destined for, including a virtual path multicast field within the routing tag indicating whether the multicast cell belongs to a virtual path multicast circuit, including an early packet discard enable field within the routing tag indicating whether the multicast cell belongs to a circuit for which an early packet discard mechanism is enabled, including an early packet discard flag within the routing tag indicating whether the multicast cell is eligible for discard by the early packet discard mechanism, including a valid cell field within the routing tag indicating whether the multicast cell is valid or invalid, and including an input identification field within the routing tag indicating the identity of an input port through which the multicast cell entered the switching fabric.

Further, there is provided, in accordance with a preferred embodiment of the present invention, a method of forming a header for a multicast cell, which is part of a virtual channel multicast circuit, for use in an asynchronous transfer mode switching fabric, including the steps of including a generic flow control field within the header, including a payload type identifier field within the header including a cell loss priority field within the header, and including a multicast group identification field within the header indicating which multicast circuit the multicast cell belongs to.

Also there is provided in accordance with a preferred embodiment of the present invention a method of forming a header for a multicast cell, which is part of a virtual path multicast circuit, for use in an asynchronous transfer mode switching fabric, including the steps of including a payload type identifier field within the header, including a cell loss priority field within the header, including a multicast group identification field within the header indicating which multicast circuit the multicast cell belongs to, and including a virtual channel identifier field within the header indicating which virtual channel within the virtual path multicast circuit the multicast cell belongs to.

BRIEF DESCRIPTION OF THE DRAWINGS

The invention is herein described, by way of example only, with reference to the accompanying drawings, wherein:

FIG. 12 illustrates the format for an ATM cell upon exit from the port interface module just prior to entering the switching fabric;

FIG. 13 illustrates the format for the routing tag for unicast cells;

FIG. 14 illustrates the format of the routing tag for multicast cells;

FIG. 15 illustrates the format of the ATM header for a multicast cell which does not belong to a virtual path multicast circuit;

DETAILED DESCRIPTION OF THE INVENTION

Figure 1:
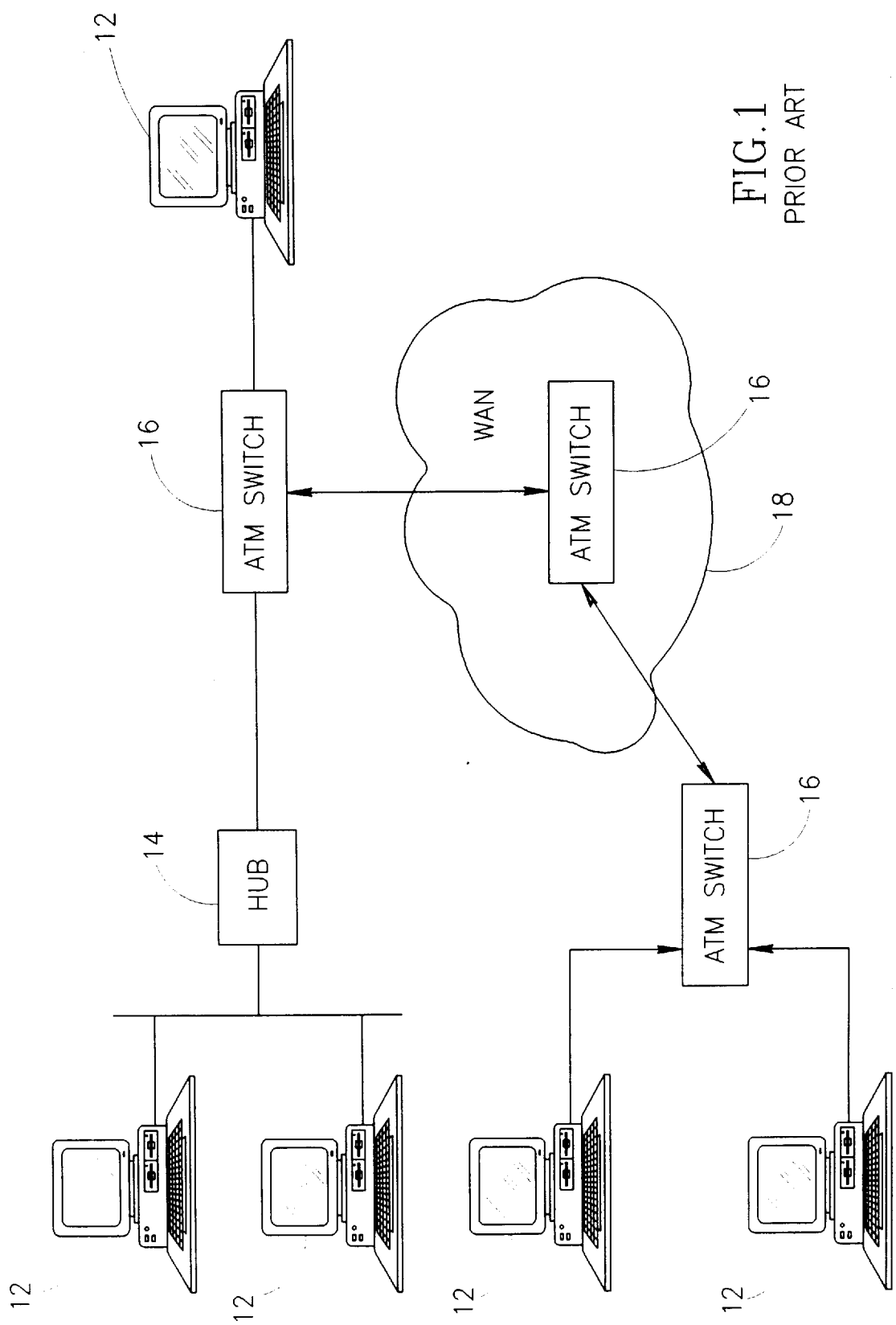
FIG. 1 is a prior art high level block diagram illustrating ATM switches applied to a sample networking application.
Figure 2:
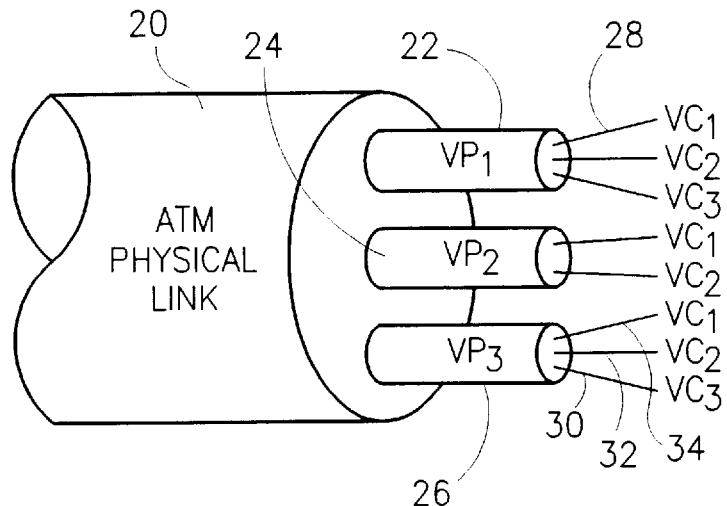
FIG. 2 is a prior art high level diagram illustrating the hierarchy of virtual channels and virtual paths within an ATM physical link.
Figure 3:
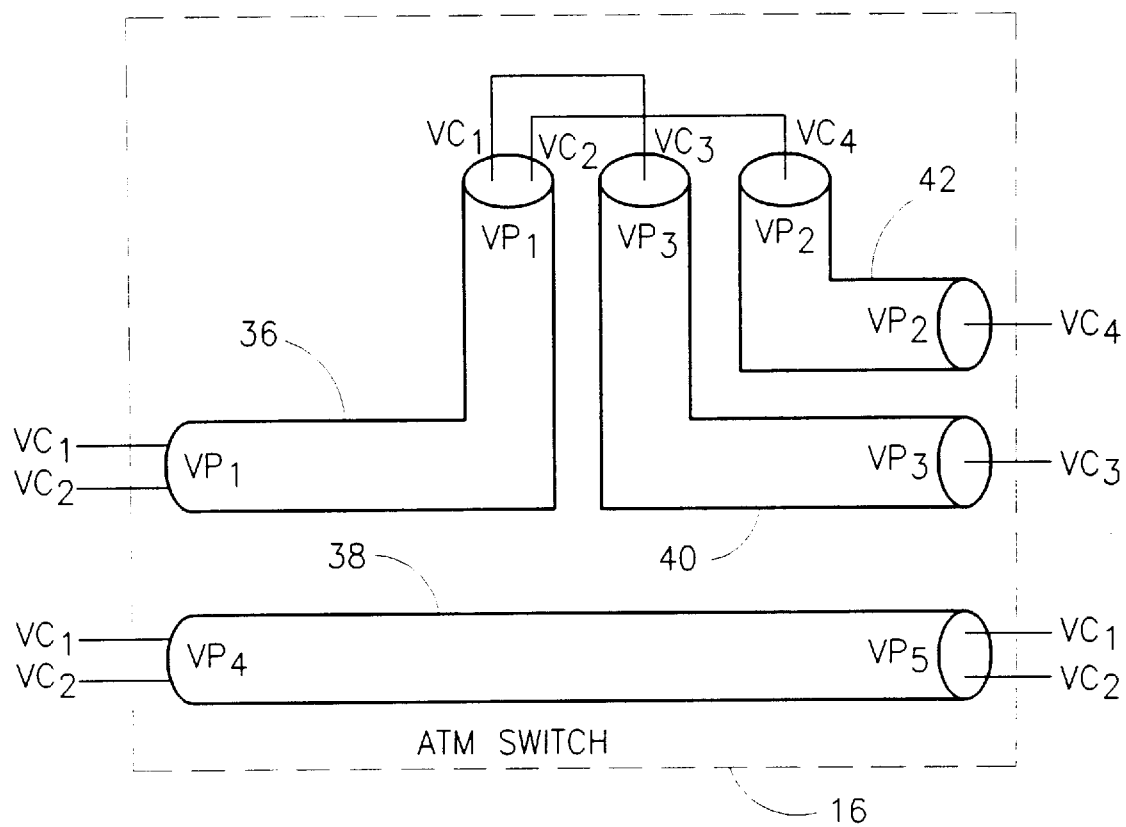
FIG. 3 is high level diagram illustrating a prior art example of virtual channels and virtual paths within an ATM switch.
Figure 4:
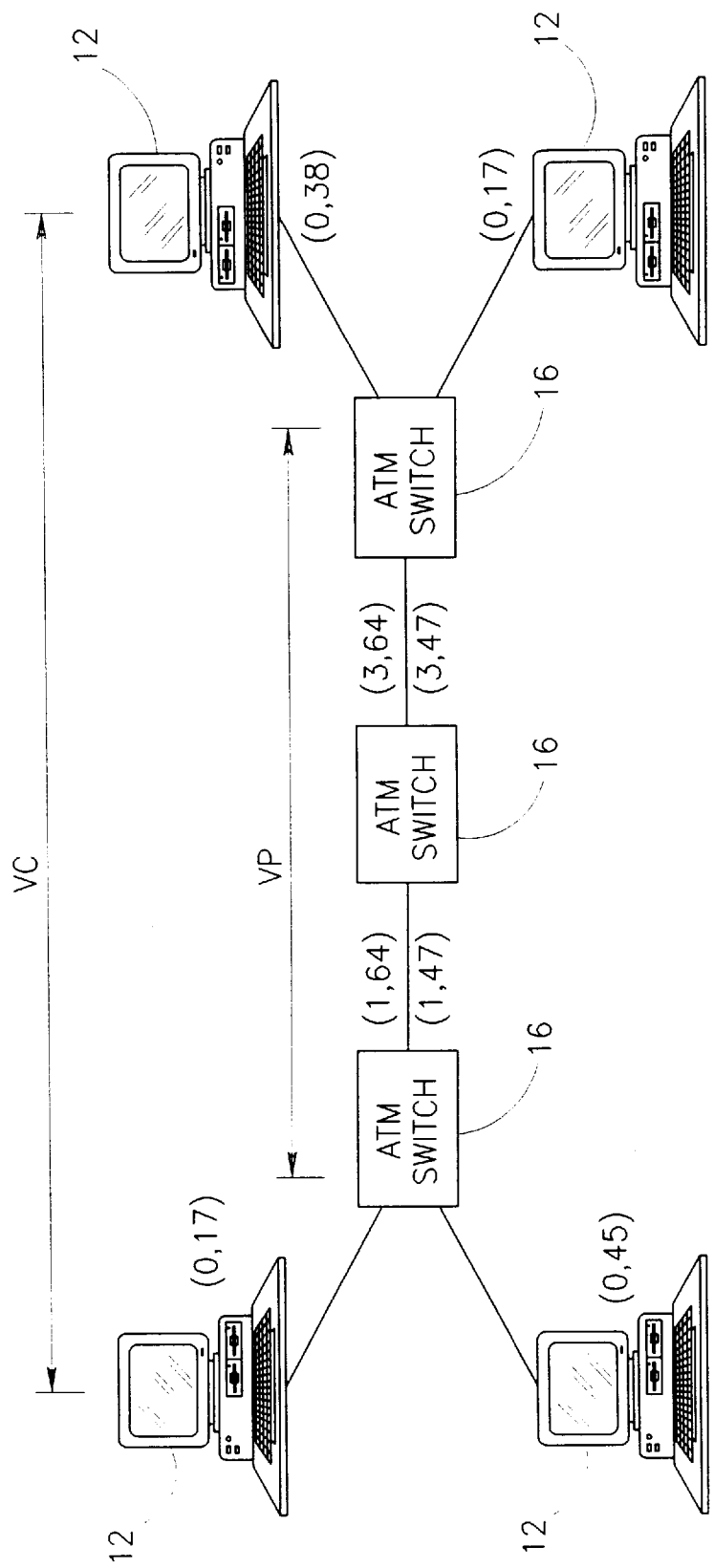
FIG. 4 is a high level diagram illustrating a prior art example of virtual path switching in a multiple ATM network.
Figure 5:
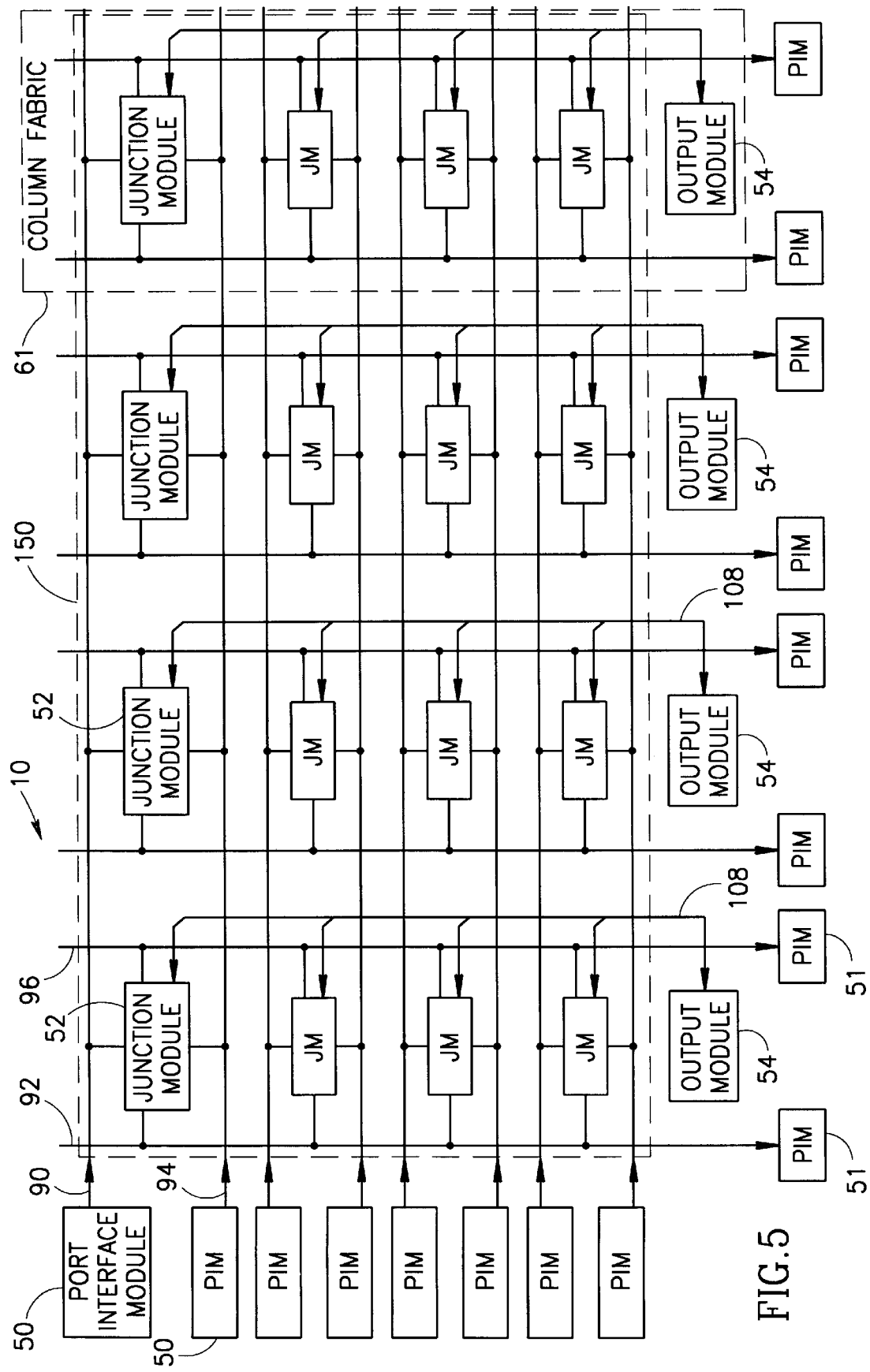
FIG. 5 is a high level block diagram illustrating an embodiment of the present invention in an 8×8 configuration.

A preferred embodiment of the present invention, switch 10, is illustrated in FIG. 5. Input port interface modules (PIMs) 50 feed two input buses, top bus 90 and bottom bus 94. An output PIM 51 is connected to two output buses, left bus 92 and right bus 96. Junction modules (JMs) 52 are attached to both input and both output buses. Output module (OM) 54 has dedicated control signal lines 108 connected to each junction module 52. In a preferred embodiment, each input PIM 50 and output PIM 51 are actually implemented as a single component. However, for clarity, they have been drawn as separate components. Each PIM 50, 51 pair includes both an input section and an output section. Thus for the 8×8 configuration shown in FIG. 5, only eight PIMs are needed.

The present invention, embodied in switch 10, has been built and implemented as a 5.12 Gbps switch. The present invention, however, allows a core switching fabric 150 to be easily scaled both upwards and downwards as desired. For example, a 16×16 switching fabric achieves an aggregate bandwidth of 10.24 Gbps.

In a preferred embodiment, the switching fabric 150 is distributed, scalable and 5 modular and is implemented as an 8×8 matrix, where the rows of the matrix are the buses carrying incoming traffic from PIMs 50 (i.e. the pair of top and bottom input buses 90, 94 respectively) and the columns are the buses carrying the output traffic to PIMs 51 (i.e. the pair of left and right output buses 92, 96, respectively). An ATM cell traversing an input bus, may be output onto any of the eight output buses.

Output bus contention, inherent in a matrix architecture, is resolved by cell buffering at each intersection of input and output buses and by an arbitration mechanism which schedules the servicing of the various cell buffer pools located at each intersection and attached to each output bus. In a preferred embodiment of the present invention, each set of four adjacent intersections is managed by a single junction module 52. In an alternative embodiment, each of the four intersections may be managed by a separate junction module. All junction modules attached to the same output bus report to and are scheduled for service by the same output module 54. Thus, each fabric column 61 in the switch fabric 150 includes one output module 54 and four junction modules 52. In a preferred embodiment of the present invention, each column is constructed on a separate printed circuit (PC) board. A backplane connects switch fabric columns 61 together.

Figure 6:
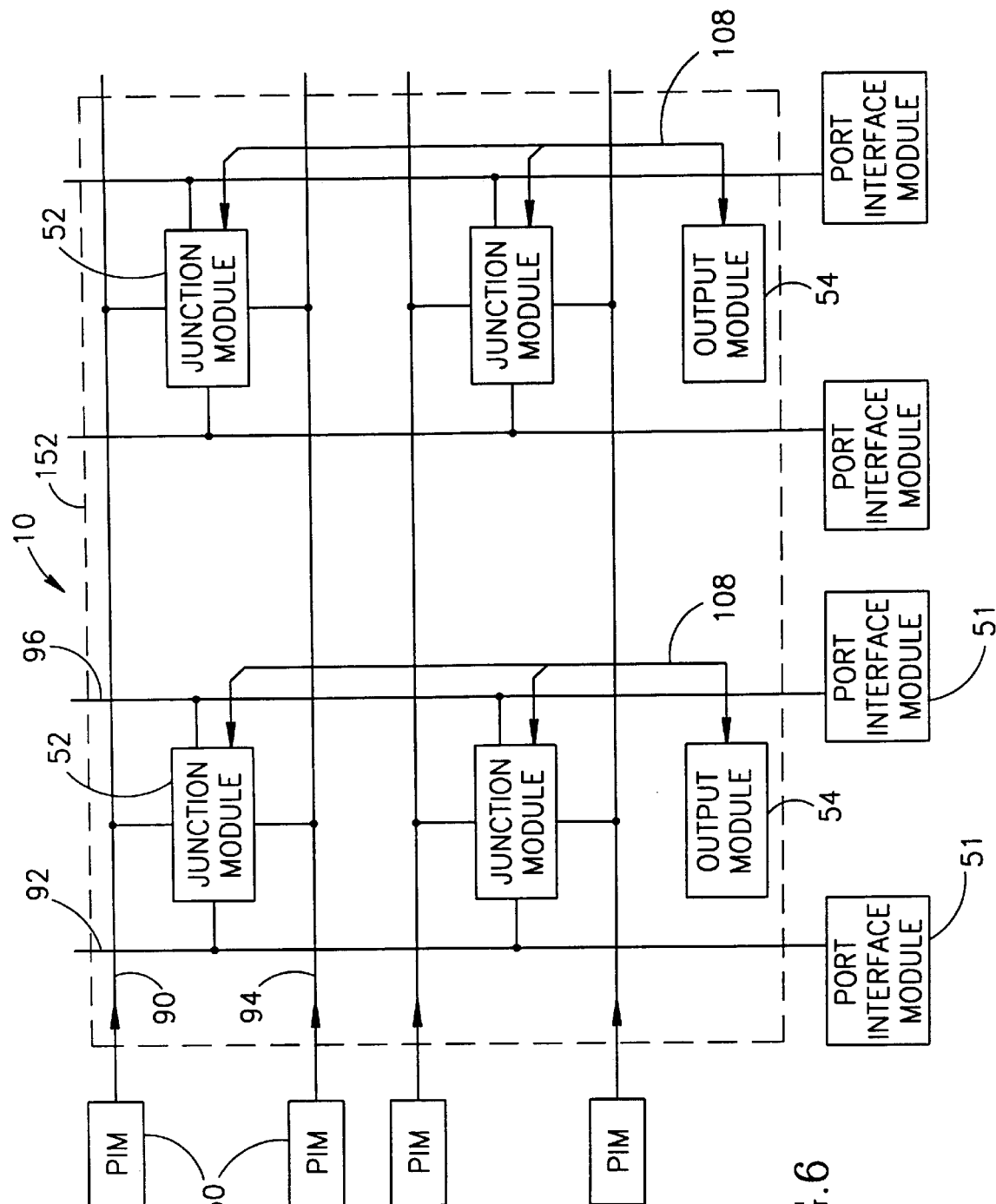
FIG. 6 is a high level block diagram illustrating an embodiment of the present invention in a 4×4 configuration.

A preferred embodiment of the present invention showing switch 10 of FIG. 5 scaled down to a 4×4 configuration is illustrated in FIG. 6. Switch 10 includes only two fabric columns, each fabric column includes two junction modules 52 coupled to input buses from PIMs 50 and output buses to PIMs 51. Output modules 54 are coupled to each junction module 52, within each fabric column, via dedicated control signal lines 108.

Figure 7:
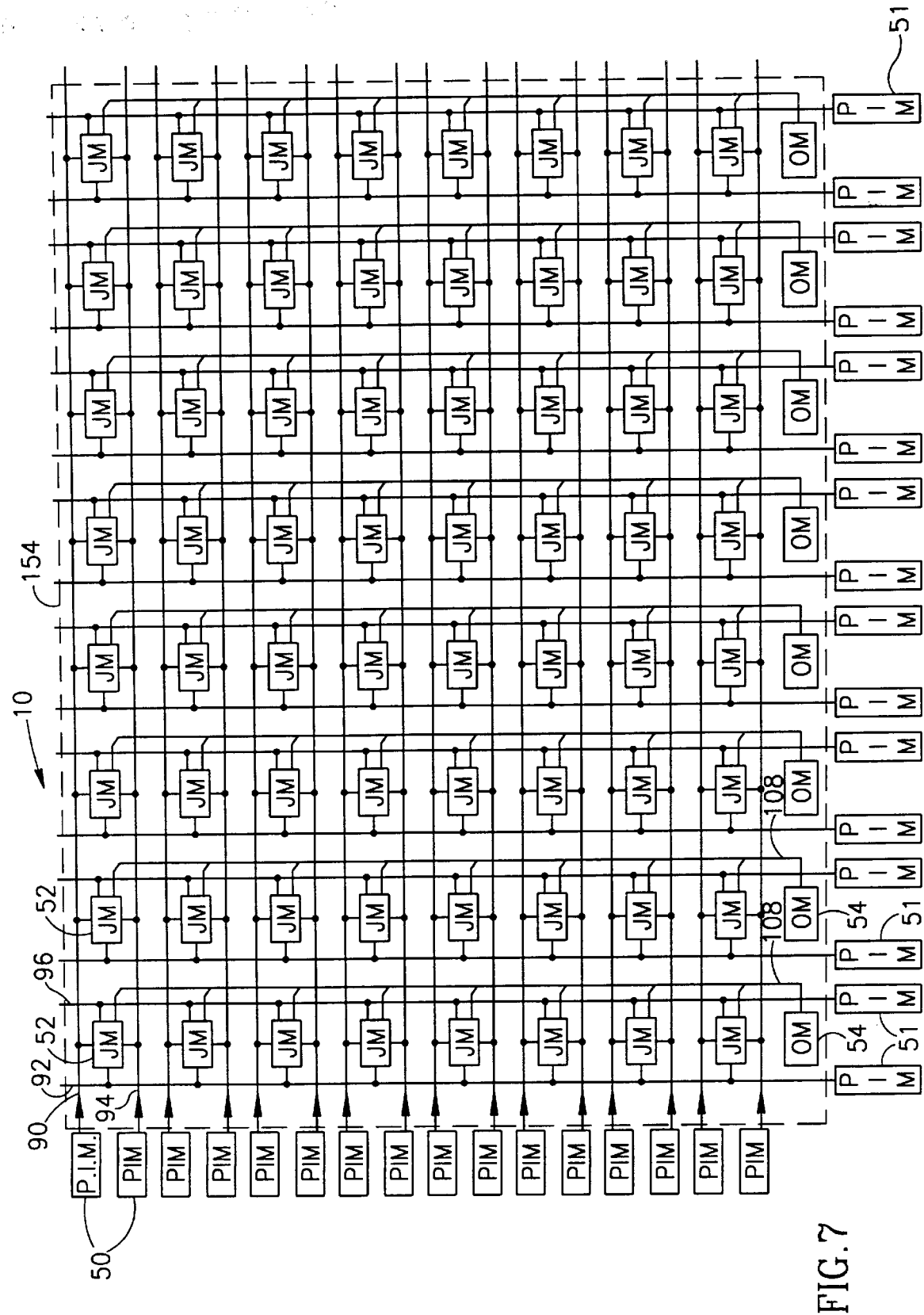
FIG. 7 is a high level block diagram illustrating an embodiment of the present invention in a 16×16 configuration.

A preferred embodiment of the present invention showing switch 10 of FIG. 5 scaled up to a 16×16 configuration is illustrated in FIG. 7. Switch 10 includes eight fabric columns, each fabric column including eight junction modules 52 coupled to input buses from PIMs 50 and output buses to PIMs 51. Output modules 54 are coupled to each junction module 52, within each fabric column, via dedicated control signals 108.

PIMs 50, 51 provide the interface between physical ports and switch fabric 150. Inbound traffic from each PIM 50 is managed by dedicated physical layer devices that provide physical medium dependent (PMD) and transmission convergence (TC) sublayer services. These services include medium interface, line coding, cell delineation and cell rate coupling.

Figure 8:
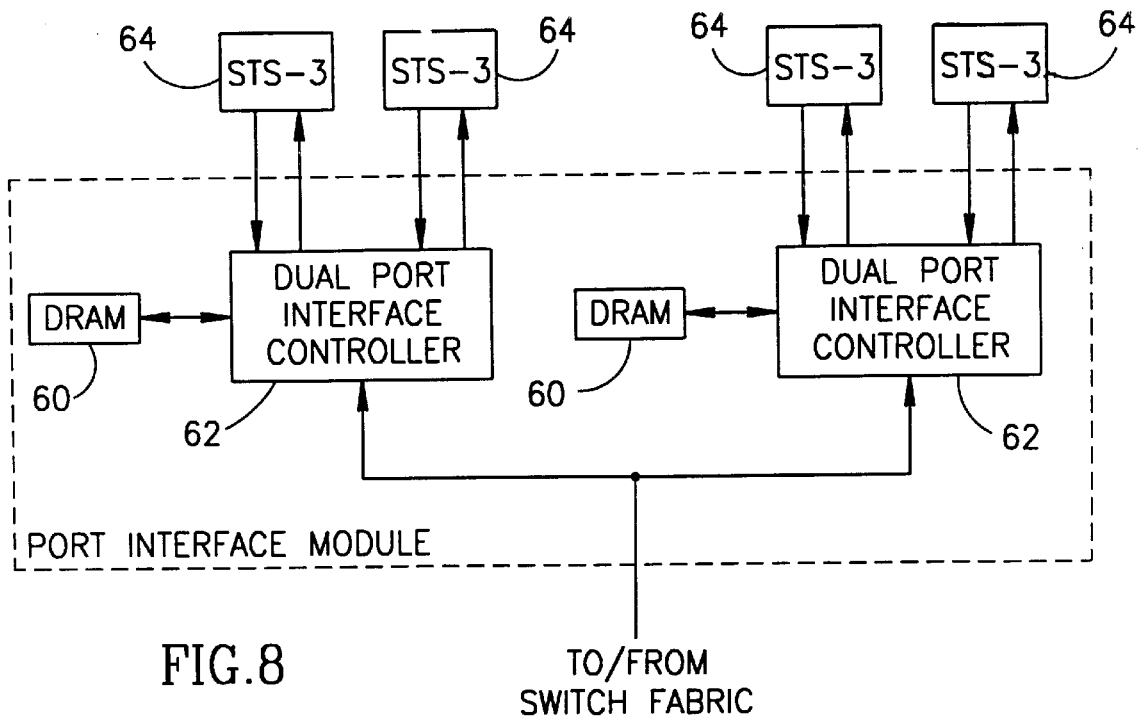
FIG. 8 is a detailed block diagram illustrating a preferred embodiment of a port interface module.

Shown in FIG. 8 is an example of a PIM pair 50, 51 illustrated in more detail. As mentioned, each PIM provides the interface between the physical ports and switch fabric 150. The major components of each PIM are two dual port interface controllers (DPICs) 62 which couple switch fabric 150 to physical devices 64. As an example, physical devices 64 may be STS-3 devices each communicating at a speed of approximately 155 Mbps for a total throughput of 640 Mbps for each PIM pair 50, 51. However, the port interface module may be configured to handle any combination of up to 14 physical ports having an aggregate bandwidth of 640 Mbps. Dynamic random access memory (DRAM) 60 is coupled to each DPIC 62. One input bus and one output bus from switch fabric 150 are coupled to both DPICs 62.

Cells input from a physical port are received by DPIC 62. Each DPIC 62 includes two 155 Mbps port interface controllers (PICs). Each PIC matches data rates between the physical ports and switch fabric 150. The PICs determine the ATM cell's VPI and VCI, perform label swapping (i.e. assigning new VPI/VCI pairs) and add routing tags before submitting the cell to switch fabric 150. The routing tag is 32 bits wide and is prepended to each arriving ATM cell. The routing tag determines the way switch fabric 150 processes the cell. The format of the routing tag is described later in more detail.

The switch fabric 150 and DPICs 62 work in a synchronous system, with all components operating on a common clock signal. In a preferred embodiment of the present invention the clock signal has a frequency of 40 MHz. A reference clock signal is used to synchronize switch fabric 150 and DPIC 62 to common time slots, known as cell cycles. Each cell cycle consists of 28 clock cycles, which corresponds to the time required to transmit a 56 byte cell. The 56 byte cell includes a 52 byte ATM cell, excluding the header error check (HEC) byte, plus the 4 byte routing tag. Cells are transmitted over 16 bit data buses.

Figure 9:
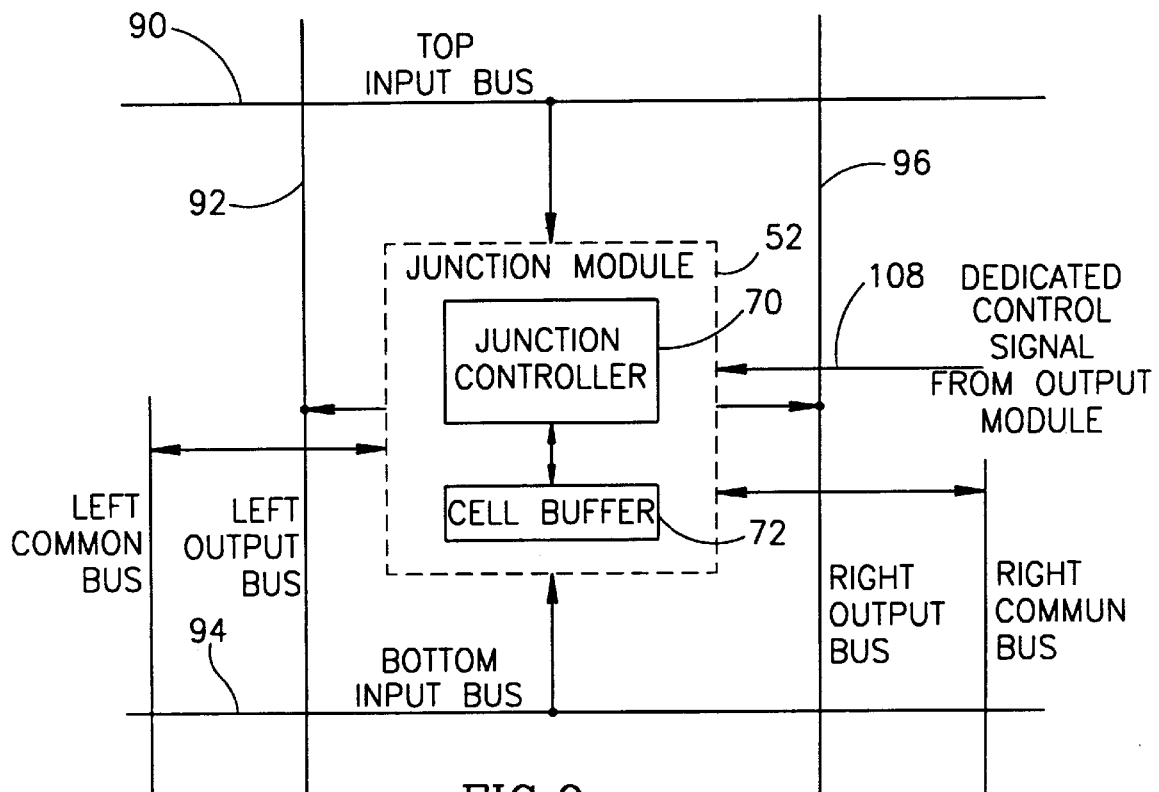
FIG. 9 is a detailed block diagram illustrating the junction module and associated buses.

The structure of junction module 52 is shown in more detail in FIG. 9. Each junction module 52 has two components, a cell buffer 72 and a junction controller 70. Cell buffer 72 includes static random access memory (SRAM) coupled to junction controller 70. However, any suitable memory device may be used. Junction controller 70 includes a quad crosspoint switch capable of switching any two of its inputs to any two of its outputs. Switching fabric is distributed because the cell switching occurs across a multitude of junction modules and is not centralized in one large switching element.

Each junction controller 70 is coupled to two input buses, top and bottom buses 90, 94, respectively and two output buses, left and right buses 92, 96, respectively. A cell traversing one of the input buses is admitted into the junction occupied by junction module 52 if the cell is intended for one of the physical ports attached to one of the output buses connected to junction module 52. Cells admitted into junctions that are connected to the same output bus are scheduled for transmission by output module 54 (see FIG. 5) that is associated with (i.e. controls) that output bus. For 8×8 switch fabric 150, shown in FIG. 5, there are 16 junctions. For 4×4 switch fabric 152 (see FIG. 6) there are 4 junctions. For 16×16 switch fabric 154 (see FIG. 7) there are 64 junctions.

Junction controller 70 functions to store cells that are awaiting transmission onto either left output bus 92 or right output bus 96, in cell buffer 72. Cells are organized in separate queues according to their destination physical port and their service class. This process is termed output queuing. In a preferred embodiment of the present invention, switch 10 can support up to 14 physical ports and 4 service classes.

Junction controller 70 reports, to output module 54 (FIG. 10), the traffic class, the intended destination of each incoming cell and the value of the cell loss priority (CLP) bit of the cells on its input buses. The function of the CLP bit will be described later. Only output module 54 maintains cell counts for each queue and also has knowledge of the configured limits for each particular queue. Thus, junction controller 70 waits for instructions from output module 54 before adding the incoming cell to a queue. If output module 54 instructs junction controller 70 to drop the cell, junction module 70 notifies PIM 51 that the cell has been dropped. Output module 54 notifies junction controller 70 when the cell at the head of a queue is ready to be scheduled for output transmission by specifying the identity of the particular queue.

Figure 10:
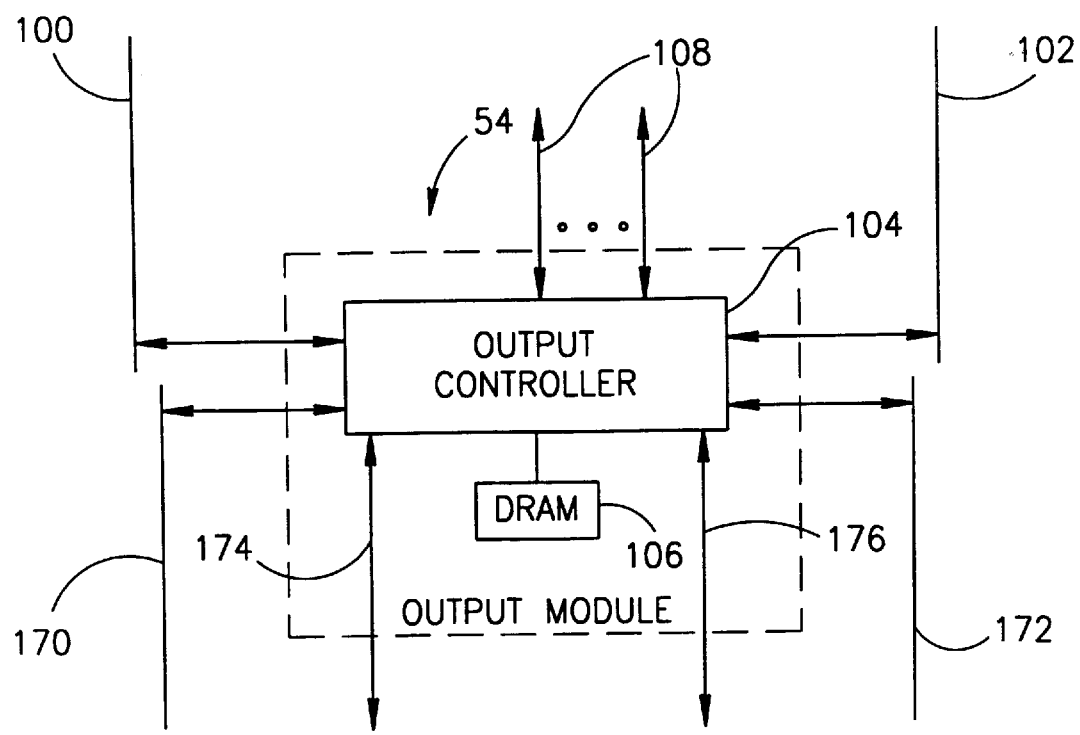
FIG. 10 is a detailed block diagram illustrating the output module and associated buses.

A detailed block diagram of output module 54 is illustrated in FIG. 10. Each output module 54 comprises an output controller (OC) 104 and a memory buffer or DRAM 106. Each output module 54 serves two output buses, left bus 92 and right bus 96 (see FIG. 5). Each output module 54 maintains a dedicated control signal line 108 to each junction module 52 in its associated fabric column. In addition to dedicated control signal lines 108, two bidirectional common buses, each two bits wide, left common bus 100 and right common bus 102, are shared between all junction modules 52 in a fabric column and associated output module 54.

Output module 54 is responsible for scheduling the transmission order of cells over each of the output buses. In each cell cycle, output module 54 determines which of the four junction modules attached to the same output buses may transmit a cell on each bus. In addition, output module 54 determines from which queue the cell is transmitted from. In 8×8 switching fabric 150 (see FIG. 5) there are four output modules 54. In 4×4 switching fabric 152 ( see FIG. 6) there are two output modules 54. In 16×16 switching fabric 154 (see FIG. 7) there are eight output modules 54.

All junction modules 52 within a column report to their associated output controller 104 the destination and class of each of their incoming cells. Output controller 104 maintains cell counts for each queue in each junction module 52 located within its fabric column. Output controller 104, accessible by a system host or system manager, allows the host to program limits for the length of each queue in each of the junctions. Both an absolute limit and a maximum length at which cells with their CLP bit set to 1 are still admitted are set by the host. If a particular cell violates the configured limits, output controller 104 instructs junction module 52 to drop the cell. Counts of dropped cells are maintained for each queue and are also accessible to the host.

Figure 11:
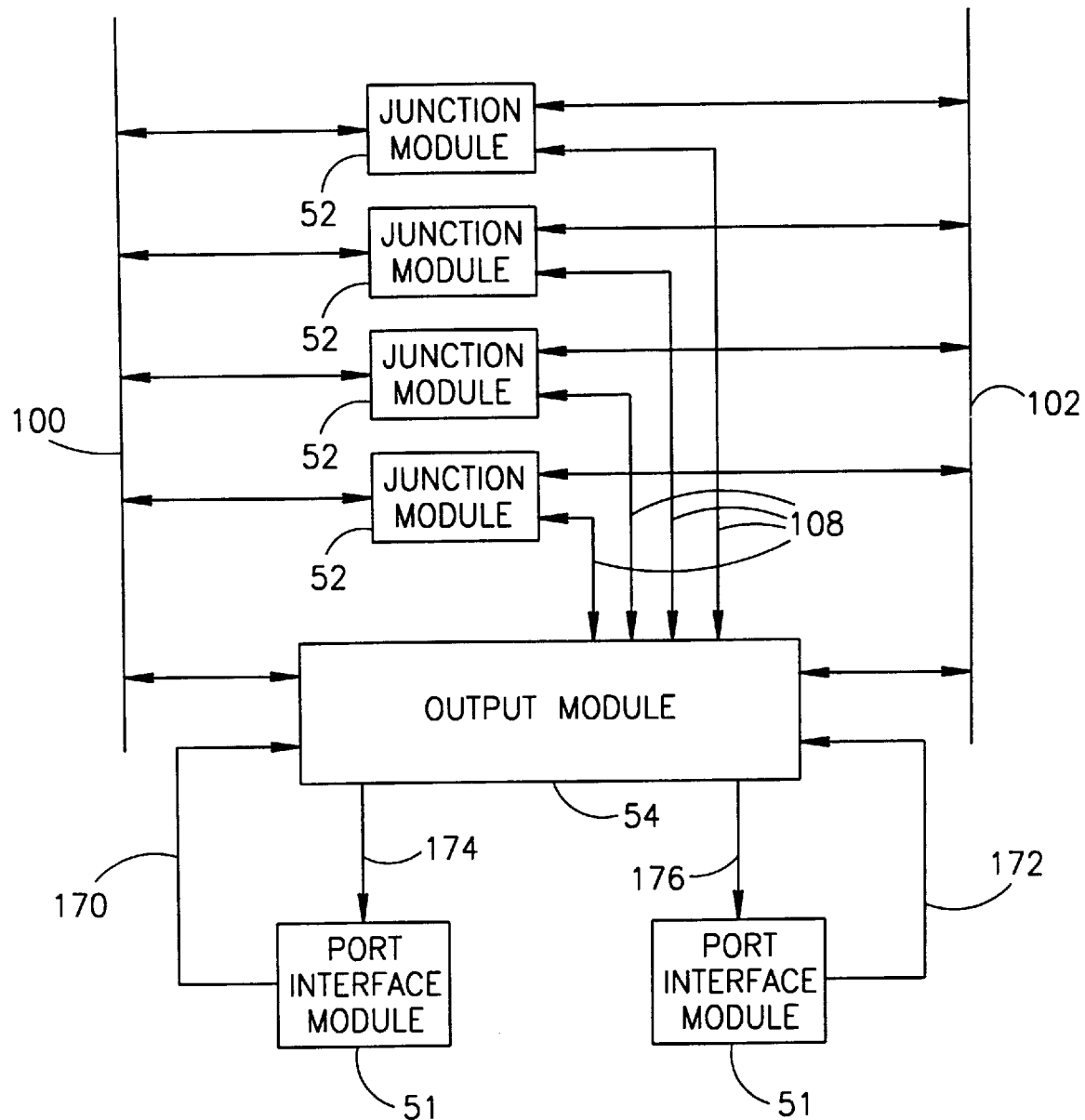
FIG. 11 is a block diagram illustrating the dedicated control signal lines between the output module and its associated junction modules and port interface modules.

The connection of junction modules 52 to output module 54 is illustrated in FIG. 11. The four junction modules shown in FIG. 11 correspond to one of the fabric columns 61 illustrated in FIG. 5. A dedicated control signal line 108 couples each junction module 52 with output module 54. In addition, output module 54 and junction modules 52 are coupled to both left common bus 100 and right common bus 102.

In a preferred embodiment the switch fabric comprises several groups of PIMs wherein each group comprises M PIMs, with M being an integer. For each PIM within a group there is a corresponding input and output bus. Associated with each group of PIMs is one junction module. Thus for each group of M PIMs, there are M input and output buses and one junction module to service the M×M intersections. The switching fabrics illustrated in FIGS. 5–7 are a special case where M is equal to 2. The number of rows and columns (i.e. N) is independent of the number of PIMs within a group.

Switch 10 has the capability of routing both unicast and multicast cells. Unicast cells are cells which have a one to one source to destination relationship. Multicast cells are cells having a one to many source to destination relationship. Switching fabric 150 can output a unicast cell, input on any physical port, to any of the 112 possible physical output ports (8 output buses times 14 possible physical output ports associated with each output bus (see FIG. 5) ). Cells are stored in separate queues according to their destination physical port and their associated service class.

The routing tag is used to route unicast cells through switching fabric 150. The routing is assigned to an a unicast cell upon input at PIM 50. Each routing tag identifies the cell's destination output bus, destination output port and the service class it belongs to. If junction module 52 identifies the cell as intended for a bus (either left or right output bus 92, 96, respectively, (see FIG. 5)) to which it is connected, it captures the cell and reports to output module 54 associated with that junction module. If the cell is admitted by output module 54, it is scheduled for transmission to PIM 51 at a later time.

Switching fabric 150 can also output a multicast cell, input on any physical port, to any combination of the 112 possible physical output ports supported by switching fabric 150 (see FIG. 5). A different VPI/VCI value is assigned to each copy of the cell. Switching fabric 150 distributes incoming multicast cells to all intended destination output physical ports in two stages. In the first stage, each multicast cell is distributed to all intended output buses by being broadcast on the input bus connected to the PIM it was received by. In the second stage, within each intended output bus, the cell is distributed to all intended physical output ports via cell replication. Cell replication at the output port, rather than at the input port, greatly reduces traffic through the switch fabric. Each stage will now be described in further detail.

The routing tag, assigned by PIM 50 to each multicast cell input thereto, contains a bitmap of the output buses for which the cell is intended. In the first stage, when the cell is broadcast on an input bus (i.e. top or bottom input bus 90, 94, respectively), each junction module 52 examines two bits in the bitmap which correspond to left and right output buses 92, 96, respectively, that that particular junction module 52 is coupled to. Junction module 52 admits the cell if it is destined to at least one of the output buses it is coupled to. Since, the routing tag does not specify the destination physical ports within each output bus, all multicast cells are stored in special multicast queues separate from unicast cell queues. Junction modules 52 report the arrival of a multicast cell to their output module 54 in the same manner as for unicast cells. Output modules 54 maintain separate counters for multicast queues.

In the second stage cells are distributed to all intended physical output ports. A bitmap, describing the set of destination physical ports for each multicast group or circuit, is stored in a multicast table. Multicast tables are stored in DRAM 106 (see FIG. 10) and managed by the output controller corresponding to the intended output bus. In addition to the destination bitmap, the multicast table contains the VPI/VCI value to be assigned to each cell from this particular multicast group when the cell is sent to each of the intended destination physical output ports.

As will be described later, incoming multicast cells. from PIMs 50, contain an 18 bit multicast group identifier, MC-GROUP-ID, in the VPI/VCI field of their ATM cell headers. This multicast group identifier is a pointer to the multicast table. The pointer specifies where in the multicast table the destination bitmap and VPI/VCI values for this multicast group is stored. A bit in the cell header identifies cells which belong to VP multicast circuits. For these cells, the MC-GROUP-ID is 12 bits long and is stored in the 12 most significant bits (MSBs) of the ATM header.

For a multicast cell to be eligible for selection, its corresponding output controller 104 must have knowledge of the cell's intended destination physical output ports. Output controllers 104 maintain separate cell queues for each class of service for all junction modules 52 within a fabric column. The first cell in each queue is called the current multicast cell. When output controller 104 selects a new current multicast cell, it requests the junction module holding that cell to transmit the MC-GROUP-ID of the cell. After receiving the MC-GROUP-ID, output controller 104 reads the destination bitmap for that cell from the corresponding multicast table and then utilizes this bitmap in the selection process.

After output controller 104 selects one of the current multicast cells for transmission to a given physical output port, it reads the appropriate VPI/VCI value for the multicast cell for that output port. The VPI/VCI value is sent to the appropriate junction module along with a command to transmit a copy of the multicast cell to the output bus.

A description of the cell and ATM header format will now be given. An ATM cell entering switch 10 is reformatted at the output of a PIM 50 to have a format as shown in FIG. 12. The ATM cell contains a 4 byte routing tag, 4 byte ATM header and 48 byte payload. Upon input from the network, the fixed ATM cell size of 53 bytes includes a 5 byte ATM header and a 48 byte payload. The ATM header includes an extra byte for the header error checksum (HEC). Once within switch 10, PIM 50 discards the HEC byte and adds the 4 byte routing tag, for a total of 56 bytes. The HEC is re-calculated and re-inserted, however, upon output of the cell from PIM 51 to the network (see FIG. 5). This 56 byte internal cell format is maintained while the cell traverses the switching fabric. In a preferred embodiment, all internal buses of switch 10 are 16 bits wide. Thus, it takes 28 clock cycles to transmit a complete cell.

The format of the routing tag for unicast cells is shown in FIG. 13. The format for the routing tag, as well as other formats present below, are shown with least significant bit 1 (LSB) on the right side and MSB 8 on the left side. Formats are given in byte by byte order with the most significant byte on top and the least significant byte on the bottom.

The two bit SERVICE CLASS field defines the service class of the cell. A value of '0' represents the available bit rate (ABR) class. The ABR class is the only service class giving feedback to the data source device. Other service classes are constant bit rate (CBR), variable bit rate (VBR) and unspecified bit rate (UBR). CBR is used typically with audio and video data and VBR is typically used with computer data. The MC field indicates whether the cell is a multicast cell or not. A '0' indicates a non-multicast cell (i.e. unicast cell) and a '1' indicates a multicast cell. The 4 bit OUTPUT BUS field indicates which output bus the cell is intended for (i.e. 0 to 15). A 4 bit PORT field indicates the destination port (i.e. 0 to 13) within the specified output bus.

An XPND bit indicates whether the VCI field should be expanded into a VPI/VCI value by output PIM 5 1. A value of '0' indicates that the 16 bits of the VCI field should be expanded into a full 24 bit VPI/VCI value according to a link-specific mask configured in the outgoing PIM 54. A '1' indicates that the cell has the VPI/VCI value ready for output. Switch 10 supports two ways of handling VPI/VCI value assignments. One way is to assign the full 24 bit VPI/VCI value. The other way is to expand a 16 bit VCI value into a full 24 bit VPI/VCI value. Unicast VCI connections can user either of these two ways. Either the full 24 bit VPI/VCI value is specified initially or the 16 valid bits in the VCI field at the input are expanded into a 24 bit VPI/VCI value at the output. Unicast VP and multicast VP connections only use the full VPI/VCI method. This is because, for unicast VP connections, the VCI is not altered at input to switching fabric 150, only the VPI is swapped for a new VPI assignment. For multicast VPs, junction modules 52 only write the VPI field. Thus, for unicast and multicast VP connections, there is no need to expand the VPI/VCI field at the output.

Multicast VC connections only use the expansion method. Junction modules 52 write the 16 effective bits of the VPI/VCI value into the VCI field of the ATM header. Expanding the 16 bits into a full 24 bit VPI/VCI value is performed by output PIM 51.

The C-AV flag set to a '1' indicates that the cell is valid and when set to '0' indicates that the cell is invalid. Empty or null cells are input to switching fabric 150 when no input traffic enters switch 10 from physical device 64 (see FIG. 8). The EPD-ENBL bit set to a '1' indicates that the cell belongs to a circuit for which an early packet discard (EPD) mechanism is enabled. The EPD-FLAG set to a '1' indicates that the cell is eligible for discard by the EPD mechanism. The IN-PORT-ID is an 8 bit field indicating the identity of the input port through which the cell has entered switch 10. Fields labeled RESERVED are not currently in use.

The early packet discard mechanism will now be described in more detail. As explained earlier, each information packet received from physically attached devices (i.e. networking transmission equipment) for transmission through an ATM network, is first divided into cells. For some service classes offered by an ATM network, a loss of one cell requires the source to retransmit the entire packet. For such service classes, it is more efficient, in terms of buffer space, to discard a cell in advance, in the event its associated buffer is nearly full. This mechanism prevents buffer or queue overflow by cells belonging to a packet whose probability of surviving the switching fabric is small anyhow. The mechanism operates as follows.

Each cell transmitted from PIM 50 has a EPD-ENBL and EPD-FLAG bit in its routing tag. The EPD mechanism can be enabled or disabled for each connection. The PIM sets the EPD_ENBL bit of all the cells of that connection to a '1' or a '0', respectively. PIM 50 sets the EDP_FLAG bit of the first cell of a packet to a '1' and the EDP-FLAG bit of the remainder of cells to '0'. When the junction controller receives a cell with its EPD-ENBL set, it places the value of the EPD-FLAG bit in place of the CLP bit within the cell report to the output controller. Thus, if the queue the cell is destined for is in the almost full state, the output controller will instruct the junction controller to discard the cell. The output controller subsequently issues a cell drop command to the appropriate port interface controller. When the port interface controller detects that a cell belonging to a connection with early packet discard enabled, it discards the remainder of the packet without any further intervention required.

The format of the ATM header for unicast cells (words 2 and 3, see FIG. 12) is in accordance with specifications established by the ATM standards bodies. In addition, the contents of the VPI/VCI field is consistent with the value of the XPND bit in the routing tag (i.e. whether the VPI/VCI is to be expanded or not).

The format for the routing tag for multicast cells is shown in FIG. 14. The SERVICE CLASS, MC, C-AV, EPD-ENBL, EPD-FLAG and IN-PORT-ID fields are identical to those of the unicast routing tag (see FIG. 13). The 16 bit OUTPUT BUS BITMAP identifies all the destination output buses for the multicast cell. The MSB of the field represents output bus 0 and the LSB represents bus 15. A '1' in the VP-MC field indicates that the cell belongs to a VP multicast circuit.

There are two types of ATM headers for a multicast cell depending on whether the multicast cell is part of a VC multicast circuit or part of a VP multicast circuit. The ATM header for a multicast cell which is part of a VC multicast circuit is shown in FIG. 15. The four bit generic flow control (GFC) field and the three bit payload type identifier (PTI) are part of the ATM standard. The one bit cell loss priority (CLP) field is also part of the ATM standard. A '0' indicating a high priority and a '1' indicating a low priority. The 18 bit MC-GROUP-ID indicates the multicast circuit or group this cell belongs to. The MC-GROUP-ID is a pointer into the multicast table for locating the destination ports of this cell. The MSB of the MC-GROUP-ID is the left most bit of the field in the second byte of the header. All the other fields of the ATM header are as defined in the ATM standard.

Figures 16, 17:
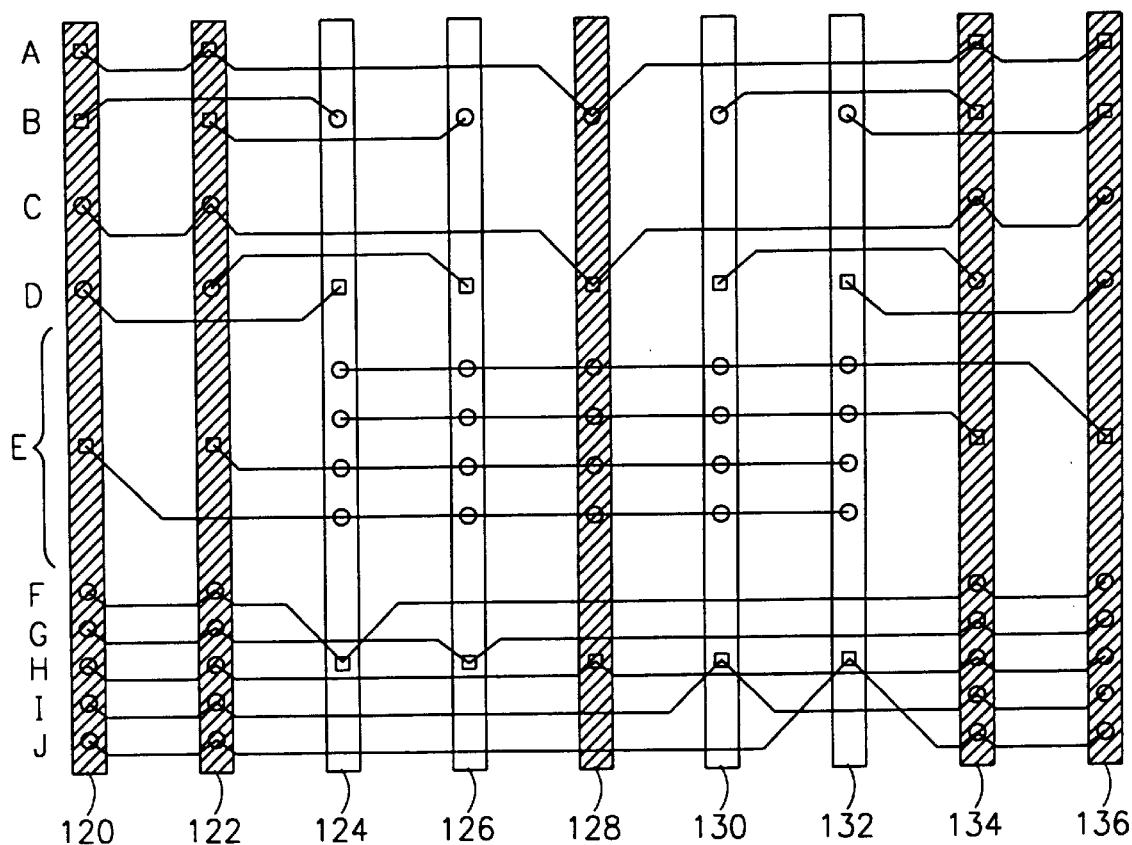
FIG. 16 illustrates the format of the ATM header for a multicast cell which belongs to a virtual path multicast circuit.
FIG. 17 is a schematic diagram of an embodiment of the present invention illustrating N+1 redundancy.

The ATM header for a multicast cell which is part of a VP multicast circuit is shown in FIG. 16. The 12 bit MC-GROUP-ID indicates the multicast circuit or group this cell belongs to. The 16 bit VCI field indicates the VC within the VP the cell belongs to. The VCI, PTI and CLP fields are as defined in the ATM standard.

Communications between output controller (OC) 104, junction controller (JC) 70 and DPIC 62 will now be described. Reference will be made to FIGS. 8 to 11 and to Tables 1 and 2. Note that Tables 1 and 2 are for the specific case of M=2. Tables representing other values of M can readily be constructed. In a preferred embodiment, the control and data lines connecting these three components operate at 40 MHz. For a 16 bit bus, this translates to a bit rate of 640 Mbps. Within each 56 byte cell cycle there are 28 clock cycles (2 bytes per clock cycle using 16 bit buses) making a cell cycle 700 ns long. Thus, each dedicated control signal line can convey 28 bits of data each cell cycle. Two internal control protocols are described below. A protocol between the junction controller and the output controller will be described first. The other protocol between the DPIC and the output controller will be described second.

The connections between output module 54 and junction modules 52 that are located in the same fabric column are shown in FIG. 11. Two bit wide left and right common buses 100, 102, respectively, are coupled between output module 54 and junction modules 52. Each junction module also has a dedicated control signal line 108 connected to output module 54. The protocol between output controller 104 and junction controller 70 operates in either of two modes: a configuration mode and an active mode. In configuration mode, the common buses and dedicated control lines are used by output controller 104 to convey to junction controller 70 various configuration parameters, such as the column coordinate ID and the number of active queues. They are used by junction controller 70 to convey to output controller 104 a response to the configuration commands. In active mode the common buses and dedicated control lines are used by junction controller 70 to report the destination of incoming cells and to transmit MC-GROUP-IDs to output controller 104, and by output controller 104 to notify one of junction controllers 70 that it has been selected to transmit its next cell onto each output bus. Output controller 104 notifies junction controllers 70 of the operating mode of the next cycle by sending an indication on right common bus 102. Referring to Table 1, the MODE bit, during cycle 8, determines the mode of operation for the next cell cycle. A '1' indicates configuration mode and a '0' indicates active mode.

TABLE 1

| CYCLE COUNT | DEDICATED CONTROL SIGNAL LINE | LEFT COMMON BUS BIT 1 | BIT 0 | RIGHT COMMON BUS BIT 1 | BIT 0 |
|---|---|---|---|---|---|
| 0 | REPORT_B(5) | VALID_L | NULL | TX_CMD_R(3) | TX_CMD_R(2) |
| 1 | REPORT_B(4) | MCGID_L(17) | MCGID_L(16) | TX_CMD_R(1) | TX_CMD_R(0) |
| 2 | REPORT_B(3) | MCGID_L(15) | MCGID_L(14) | VCI_R(15) | VCI_R(14) |
| 3 | REPORT_B(2) | MCGID_L(13) | MCGID_L(12) | VCI_R(13) | VCI_R(12) |
| 4 | REPORT_B(1) | MCGID_L(11) | MCGID_L(10) | VCI_R(11) | VCI_R(10) |
| 5 | REPORT_B(0) | MCGID_L(9) | MCGID_L(8) | VCI_R(9) | VCI_R(8) |
| 6 | NULL | MCGID_L(7) | MCGID_L(6) | NULL | REQ_C_R(1) |
| 7 | REQ_R | MCGID_L(5) | MCGID_L(4) | LAST_R | REQ_C_R(0) |
| 8 | DISC_B | MCGID_L(3) | MCGID_L(2) | NULL | MODE |
| 9 | GRANT_L | MCGID_L(1) | MCGID_L(0) | VCI_R(7) | VCI_R(6) |
| 10 | NULL | NULL | NULL | VCI_R(5) | VCI_R(4) |
| 11 | REPORT_T(8) | TX_CMD_L(9) | TX_CMD_L(8) | VCI_R(3) | VCI_R(2) |
| 12 | REPORT_T(7) | TX_CMD_L(7) | TX_CMD_L(6) | VCI_R(1) | VCI_R(0) |
| 13 | REPORT_T(6) | TX_CMD_L(5) | TX_CMD_L(4) | NULL | NULL |
| 14 | REPORT_T(5) | TX_CMD_L(3) | TX_CMD_L(2) | VALID_R | NULL |
| 15 | REPORT_T(4) | TX_CMD_L(1) | TX_CMD_L(0) | MCGID_R(17) | MCGID_R(16) |
| 16 | REPORT_T(3) | VCI_L(15) | VCI_L(14) | MCGID_R(15) | MCGID_R(14) |
| 17 | REPORT_T(2) | VCI_L(13) | VCI_L(12) | MCGID_R(13) | MCGID_R(12) |
| 18 | REPORT_T(1) | VCI_L(11) | VCI_L(10) | MCGID_R(11) | MCGID_R(10) |
| 19 | REPORT_T(0) | VCI_L(9) | VCI_L(8) | MCGID_R(9) | MCGID_R(8) |
| 20 | NULL | NULL | REQ_C_L(1) | MCGID_R(7) | MCGID_R(6) |
| 21 | REQ_L | LAST_L | REQ_C_L(0) | MCGID_R(5) | MCGID_R(4) |
| 22 | DISC_T | NULL | NULL | MCGID_R(3) | MCGID_R(2) |
| 23 | GRANT_R | VCI_L(7) | VCI_L(6) | MCGID_R(1) | MCGID_R(0) |
| 24 | NULL | VCI_L(5) | VCI_L(4) | NULL | NULL |
| 25 | REPORT_B(8) | VCI_L(3) | VCI_L(2) | TX_CMD_R(9) | TX_CMD_R(8) |
| 26 | REPORT_B(7) | VCI_L(1) | VCI_L(0) | TX_CMD_R(7) | TX_CMD_R(6) |
| 27 | REPORT_B(6) | NULL | NULL | TX_CMD_R(5) | TX_CMD_R(4) |

TABLE 2

| CYCLE COUNT | LEFT INTERFACE LINES BIT 1 | BIT 0 | RIGHT INTERFACE LINES BIT 1 | BIT 0 | LEFT OUTPUT CONTROL LINE | RIGHT OUTPUT CONTROL LINE |
|---|---|---|---|---|---|---|
| 0 | PORT 0,CLASS 0 | PORT 0,CLASS 2 | PORT 0,CLASS 1 | PORT 0,CLASS 3 | NULL | PORT 10 |
| 1 | PORT 1,CLASS 0 | PORT 1,CLASS 2 | PORT 1,CLASS 1 | PORT 1,CLASS 3 | NULL | PORT 11 |
| 2 | PORT 2,CLASS 0 | PORT 2,CLASS 2 | PORT 2,CLASS 1 | PORT 2,CLASS 3 | NULL | PORT 12 |
| 3 | PORT 3,CLASS 0 | PORT 3,CLASS 2 | PORT 3,CLASS 1 | PORT 3,CLASS 3 | CG/VC | PORT 13 |
| 4 | PORT 4,CLASS 0 | PORT 4,CLASS 2 | PORT 4,CLASS 1 | PORT 4,CLASS 3 | PORT 0 | MULTICAST_QUEUE |
| 5 | PORT 5,CLASS 0 | PORT 5,CLASS 2 | PORT 5,CLASS 1 | PORT 5,CLASS 3 | PORT 1 | NULL |
| 6 | PORT 6,CLASS 0 | PORT 6,CLASS 2 | PORT 6,CLASS 1 | PORT 6,CLASS 3 | PORT 2 | NULL |
| 7 | PORT 7,CLASS 0 | PORT 7,CLASS 2 | PORT 7,CLASS 1 | PORT 7,CLASS 3 | PORT 3 | NULL |
| 8 | PORT 8,CLASS 0 | PORT 8,CLASS 2 | PORT 8,CLASS 1 | PORT 8,CLASS 3 | PORT 4 | NULL |
| 9 | PORT 9,CLASS 0 | PORT 9,CLASS 2 | PORT 9,CLASS 1 | PORT 9,CLASS 3 | PORT 5 | NULL |
| 10 | PORT 10,CLASS 0 | PORT 10,CLASS 2 | PORT 10,CLASS 1 | PORT 10,CLASS 3 | PORT 6 | NULL |
| 11 | PORT 11,CLASS 0 | PORT 11,CLASS 2 | PORT 11,CLASS 1 | PORT 11,CLASS 3 | PORT 7 | NULL |
| 12 | PORT 12,CLASS 0 | PORT 12,CLASS 2 | PORT 12,CLASS 1 | PORT 12,CLASS 3 | PORT 8 | NULL |
| 13 | PORT 13,CLASS 0 | PORT 13,CLASS 2 | PORT 13,CLASS 1 | PORT 13,CLASS 3 | PORT 9 | CELL_AVAILABLE |
| 14 | PORT 0,CLASS 1 | PORT 0,CLASS 3 | PORT 0,CLASS 0 | PORT 0,CLASS 2 | PORT 10 | NULL |
| 15 | PORT 1,CLASS 1 | PORT 1,CLASS 3 | PORT 1,CLASS 0 | PORT 1,CLASS 2 | PORT 11 | NULL |
| 16 | PORT 2,CLASS 1 | PORT 2,CLASS 3 | PORT 2,CLASS 0 | PORT 2,CLASS 2 | PORT 12 | NULL |
| 17 | PORT 3,CLASS 1 | PORT 3,CLASS 3 | PORT 3,CLASS 0 | PORT 3,CLASS 2 | PORT 13 | CG/VC |
| 18 | PORT 4,CLASS 1 | PORT 4,CLASS 3 | PORT 4,CLASS 0 | PORT 4,CLASS 2 | MULTICAST_QUEUE | PORT 0 |
| 19 | PORT 5,CLASS 1 | PORT 5,CLASS 3 | PORT 5,CLASS 0 | PORT 5,CLASS 2 | NULL | PORT 1 |
| 20 | PORT 6,CLASS 1 | PORT 6,CLASS 3 | PORT 6,CLASS 0 | PORT 6,CLASS 2 | NULL | PORT 2 |
| 21 | PORT 7,CLASS 1 | PORT 7,CLASS 3 | PORT 7,CLASS 0 | PORT 7,CLASS 2 | NULL | PORT 3 |
| 22 | PORT 8,CLASS 1 | PORT 8,CLASS 3 | PORT 8,CLASS 0 | PORT 8,CLASS 2 | NULL | PORT 4 |
| 23 | PORT 9,CLASS 1 | PORT 9,CLASS 3 | PORT 9,CLASS 0 | PORT 9,CLASS 2 | NULL | PORT 5 |
| 24 | PORT 10,CLASS 1 | PORT 10,CLASS 3 | PORT 10,CLASS 0 | PORT 10,CLASS 2 | NULL | PORT 6 |
| 25 | PORT 11,CLASS 1 | PORT 11,CLASS 3 | PORT 11,CLASS 0 | PORT 11,CLASS 2 | NULL | PORT 7 |
| 26 | PORT 12,CLASS 1 | PORT 12,CLASS 3 | PORT 12,CLASS 0 | PORT 12,CLASS 2 | NULL | PORT 8 |
| 27 | PORT 13,CLASS 1 | PORT 13,CLASS 3 | PORT 13,CLASS 0 | PORT 13,CLASS 2 | CELL_AVAILABLE | PORT 9 |

The configuration mode protocol will now be described. All configuration information is transmitted on dedicated control signal lines 108. Configuration transactions consist of 14 bits of command from output controller 104 to junction controller 70 and 9 bits of response from junction controller 70 to output controller 104. Output controller 104 does not recognize or interpret the commands and responses. It only provides a means for the system host or system manager to communicate with junction controllers 70.

In active mode, there are three logically separate transactions carried out within each cell cycle. These three transactions include cell reports whereby junction controllers 70 notify their output controller 104 of the destination queues of incoming cells. Each JC 70 reports at most two incoming cells, one for each input bus. For each cell report, OC 104 instructs the corresponding JC 70 to store the cell or discard it. The second transaction is a transmit command, whereby for each output bus, OC 104 notifies the selected JC from which queue the next cell should be transmitted. For multicast cells, OC 104 also transmits the cell's VPI/VCI value. In the third transaction, when asked by the OC, the selected JC supplies the MC-GROUP-ID of the first cell in its queue for one of its classes on each output bus. Each type of transaction will now be described in more detail.

Cell report transactions are carried out on dedicated control signal lines 108. Each JC 70 encodes the destination queue of each of its two incoming cells (i.e. one per input bus). For each cell it also transmits the value of its CLP bit. Finally, it informs OC 104 whether it has sufficient buffer space to store that cell. After checking the current level of the queue, for each cell, OC 104 responds with a DISCARD or ADMIT command. The format for the fields of cell reports follows. Referring to Table 1, cell reports are given for both top and bottom input buses 90, 94, respectively and consist of 9 bits each, REPORT_T(0–8) and REPORT_B (0–8). For JC to OC communications, the cell report for top input bus 90 includes: the identity of the destination queue for the cell from top input bus 90, which includes of 1 bit for the output bus ('0' indicates left output bus 92, '1' indicates right output bus 96), 2 bits for class of service and 4 bits for the port; the value of the CLP bit for the cell on top input bus 90; and a bit indicating that the JC has no available buffer space to store the cell from top input bus 90. The 9 bit cell report for bottom input bus 94 is analogous to that for top input bus 90.

For OC to JC communications, only one bit for each input bus is defined. Top input bus 90 has a bit DISC_T (cycle 22) to indicate whether the cell that is received on that particular input bus is to be discarded. Bottom input bus 94 has a similar bit DISC_B (cycle 8). A '1' indicates that the cell is to be discarded and a '0' indicates that the cell is to be stored.

A transmit command transaction is carried out for each output bus. The transactions for left output bus 92 use left common bus 100 and those for right output bus 96 use right common bus 102. Transactions for both buses use dedicated control signal lines 108. The common buses are used by the OC to indicate the identity of the queue to be serviced and the VPI/VCI value for the case of a multicast cell. They are also used by the JC to inform OC 104 if the current cell is the last cell in the queue. Dedicated control signal lines 108 are used by OC 104 to notify the selected junction that it has been chosen.

Transmit commands consist of 10 bits and are indicated in Table 1 as TX_CMD_L(0–9) and TX_CMD_R(0–9) and consist of the following fields: 1 bit, whereby a '0' indicates that the cell to be transmitted is the cell heading the unicast queue corresponding specified service class and port, and whereby a '1' indicates that the cell to be transmitted is a copy of the cell at the head of the multicast queue corresponding to the specified service class. The destination port field in the ATM header of that copy of the cell should be set to the port value encoded in the transmit command; 1 bit indicating whether the copy of the multicast cell to be transmitted is the last copy required for that cell, and that the cell can be discarded afterwards; 2 bits indicating the service class; 4 bits indicating the port; 1 bit indicating whether the EFCI bit in the cell should be set or reset; and 1 bit being reserved. If the transmit command indicates that a multicast cell is to be transmitted, a 16 bit VPI/VCI value that is to be assigned to the transmitted cell is included in the command from the OC. The VPI/VCI value to be added is indicated in Table 1 as VCI_L(0–15) and VCI_R(0–15).

The JC uses 1 bit, LAST_L and LAST_R, for each output bus, to indicate to the OC that the current cell is the last cell in the queue. Although not actually necessary for normal operation of switch 10, the LAST_L and LAST_R bits provide a safety check of the internal synchronization of switch 10.

On dedicated control signal lines 108, OC 104 transmits a signal, GRANT_L and GRANT_R, for each output bus, indicating that the current junction has been chosen to transmit a cell onto the respective output bus. The information associated with the cell to be transmitted is encoded in the transmit command described above.

The third transaction, MC-GROUP-ID, is carried out for each output bus. For each transaction, the OC requests a JC to supply the MC-GROUP-ID for the cell at the head of the multicast queue for a particular service class. The JC responds with the requested value. The transaction for left output bus 92 uses left common bus 100 and the transaction for right output bus 96 uses right common bus 102. Transactions for both buses use dedicated control signal lines 108. The common buses are used by the OC to supply the identity of the desired class and by the JC to send the MC-GROUP-ID value. Dedicated control signal lines 108 are used by the OC to notify the selected JC that it has been chosen.

The OC communicates to the JC 2 bits of data representing the service class of the cell for which the MC-GROUP-ID is requested, REQ_C_L(0–1) and REQ_C_R(0–1), for left and right output buses 92, 96 respectively. The JC communicates to the OC 18 bits of data indicating the MC-GROUP-ID, referred to in Table 1 as MCGID_L(0–17) and MCGID_R(0–17), for left and right output buses 92, 96, respectively. On dedicated control signal lines 108, the OC communicates to the JC 1 bit, REQ_L and REQ_R, indicating that the current junction is being asked to supply the MC-GROUP-ID for the cell at the head of the multicast queue for the service class corresponding to the service class represented by the bits REQ_C_L(0–1) and REQ_C_R (0–1). The JC transmits the MC-GROUP-ID value on the appropriate common bus as described above.

The protocol for communications between OC 104 and DPIC 62 will now be described. Reference is made to FIGS. 8–11 and Table 2. Referring to FIG. 11, OC 104 within output module 54 communicates with DPIC 62 within left PIM 51 using a 2 bit wide left interface lines 170 and a dedicated left output control line 174. OC 104 within output module 54 communicates with DPIC 62 within right PIM 51 using a 2 bit wide right interface lines 172 and a dedicated right output control line 176. DPICs 62 issue the status of all its queues to OC 104 using left and right interface lines 170, 172. OC 104 issues cell available reports and congestion indications to DPICs 62 using left and right output control lines 174, 176. The protocol between OC 104 and left and right DPIC 62 are identical except that they are shifted by one half cell cycle (i.e. 14 clock cycles), therefore the following description will apply to both left and right DPICs 62.

Communications from the DPIC to the OC include informing OC 104 of which ports and service classes are ready to accept new cells. Each DPIC 62, connected to a single output bus, reports the status for each port/service class pair. Thus, in every cell cycle, 56 bits of data (i.e. 4 service classes times 14 possible physical ports) must be conveyed. These 56 bits are transmitted on left and right interface lines 170, 172, respectively. Referring to Table 2, on every clock cycle, 2 bits of data on each bus are transmitted, totalling 56 bits at the end of a full cell cycle. A port/class pair is deemed ready only if it can accept at least three cells.

OC 104 transmits to DPIC 62 two congestion levels ('congested' and 'very congested') of the queues belonging to service class 0 (i.e. the ABR class). OC 104 places the congestion indications in left and right output control lines 174, 176 on an alternating cell cycle basis. With reference to Table 2, the congested/very congested bit is transmitted during cycles 3 and 17 for left and right output control lines 174, 176, respectively. A '0' represents congested status data and a '1' indicates very congested status data. Congested and very congested status data alternate from one cell cycle to the next. Each bit within bits PORT 0–13 represent one of the 14 possible physical output ports. The MULTICAST_QUEUE bit indicates the congestion level of the multicast queues. The CELL_AVAILABLE bit indicates to DPIC 62 that a cell will be available from junction module 52 on the next cell cycle.

As stated previously, in a preferred embodiment, switch 10 is constructed having a distributed, scalable and modular switching fabric 150 (see FIG. 5). Four fabric columns 61 make up switching fabric 150, each fabric column is constructed on a separate printed circuit (PC) boards called fabric cards. Switching fabric is modular because any number of fabric cards can be inserted to construct a switch of any desired size. The four fabric cards, one for each fabric column, are connected together by a backplane. The modularity of switching fabric 150 allows for the addition of a redundant fifth fabric card. While all fabric cards are operating normally, the redundant fabric card remains inactive and does not participate in the traffic flow. However, when a management system within switch 10 detects a failure on one of the fabric cards, it configures the redundant fabric card the same as the malfunctioning fabric card, takes the malfunctioning fabric card out of service and activates the redundant fabric card. Thus, redundancy is achieved at a cost of 25% of the cost of switching fabric 150. This redundancy scheme can be generalized to any N card fabric, where the redundant fabric card becomes the N+1 card.

A schematic representation of the signals connecting the fabric cards and the port interface cards for an 8×8 switch (see FIG. 5) is shown in FIG. 17. Column fabric cards 124, 126, 130, 132 are connected to interface cards 120, 122, 134, 136 through a backplane. Each fabric card and each interface card supports two input buses (top and bottom) and two output buses (left and right) (not shown). Fabric card 128 is the redundant fabric card and is identical to the other fabric cards. Squares represent driving terminals and circles represent receiving terminals.

In redundant row A, cards 120, 122, 134, 136 are coupled to redundant card 128. In row B, card 120 is coupled to card 124, card 122 is coupled to card 126, card 136 is coupled to card 132 and card 134 is coupled to card 130. In redundant row C, cards 120, 122, 134, 136 are coupled to card 128. In row D, card 120 is coupled to card 124, card 122 is coupled to card 126, card 136 is coupled to card 132 and card 134 is coupled to card 130. In row E, each of cards 120, 122, 134, 136 is daisy chained to cards, 124, 126, 128, 130, 132. In row F, cards 120, 122, 134, 136 are daisy chained to card 124. In row G, cards 120, 122, 134, 136 are daisy chained to card 126. In redundant row H, cards 120, 122, 134, 136 are daisy chained to card 128. In row I, cards 120, 122, 134, 136 are daisy chained to card 130. In row J, cards 120, 122, 134, 136 are daisy chained to card 136.

During normal operation, while redundant fabric card 128 is not operative. fabric and interface cards are paired to form switch columns: cards 120, 124; 122, 126; 130, 134; and 132, 136. The signals connecting the fabric cards and interface cards can be divided into four types: control signals from each interface card to its attached fabric card; data traffic buses and control signals from each fabric card to its attached interface card; traffic buses and control signals from each interface card to all fabric cards; and control signals from each fabric card to all interface cards. The first two types are termed column-internal, meaning they are internal to each particular switch column. The last two types are termed row-internal, meaning each signal is shared by all the modules on cards belonging to the same row.

In a preferred embodiment, each port interface card comprises M port interface modules coupled to M input buses and M output buses, M being any integer. Each fabric card, including the redundant fabric card comprises N junction modules and one output module. Each junction module forms an intersection and is coupled to the M input and M output buses on one of the port interface cards. All N junction modules on a fabric card are coupled to the output module. The embodiment illustrated in FIG. 17 is for the case where M equals 2 and N equals 4. Each port interface card comprises two port interface modules and each fabric card comprises four junction modules, forming an 8×8 switching fabric.

The physical connection of these signals and the special handling of them in the event of a failure, will now be described. During normal column-internal DPIC to OC communications, each interface card transmits, on terminals situated in row B, signals to its attached fabric card (i.e. the fabric card belonging to the same column). Terminals located in row A are not driven by any of the interface cards during normal operation. When a failure is detected in a fabric card, the interface card attached to the defective fabric card is instructed to start transmitting on terminals in redundant row A. There is no contention between cards because only one interface card is driving terminals in row A. Terminal switching between rows A and B is performed by a multiplexor (mux) device programmed by the system manager or host.

Normal OC to DPIC column-internal communications take place in row D wherein each interface card receives on terminals in row D, traffic and control signals from its attached fabric card. When a failure is detected in a fabric card, the interface card attached to the malfunctioning fabric card is instructed to start receiving its signals from the terminal in redundant row C. The switching between terminals is performed by a mux programmed by the system manager.

Normal DPIC to JC row-internal communications occurs in the rows within group E. Each interface card normally transmits top and bottom input bus 90, 94 traffic and control signals to all fabric cards, including redundant fabric card 128. When a fabric card fails, no signals need be switched because redundant fabric card 128 already receives all the signals from each interface card.

JC to DPIC row-internal communications will now be described. Each interface card includes five terminals for signals from each fabric card, represented by rows F, G, I and J. Row H represents the redundant row for use in the event of a fabric card failure. During normal operation, each interface card receives on terminals F, G, I and J signals from each fabric card. This is because each JC 70 within a fabric column must communicate with a DPIC 62 located on a different interface card. When a failure is detected in a fabric card, all the interface cards are instructed to receive signals from terminals in row H rather than from the terminals in the row associated with the malfunctioning fabric card. The switching on the interface cards is performed by a mux programmable by the system manager. There is a separate mux to switch between terminals in rows H, E; H, G; H, I; and H, J.

In an alternative embodiment, the connections between interface and fabric cards can be implemented using a time division multiplexing (TDM) arrangement. Using a TDM scheme, all fabric cards drive signal lines shared by all the interface cards. When a failure is detected, the redundant card is instructed to drive the signal lines during time slots which were previously allocated to the malfunctioning card. In this embodiment, no muxing needs to be performed by the interface cards.

While the invention has been described with respect to a limited number of embodiments, it will be appreciated that many variations, modifications and other applications of the invention may be made.

What is claimed is:

1. An asynchronous transfers mode switching fabric, comprising:

a top input bus;

a bottom input bus;

a left output bus;

a right output bus;

a plurality of pairs of port interface modules wherein each said pair of port interface modules includes a first and second port interface module, said first port interface module coupled to said top input bus, said second port interface module coupled to said bottom input bus, said plurality of pairs of port interface modules for coupling network transmission equipment to said switching fabric;

a plurality of junction modules arranged as a matrix of N rows by N columns wherein each junction module within each row is coupled to said top input bus and said bottom input bus, each row associated with one of said pairs of port interface modules, each junction module within each column coupled to said left output bus and said right output bus, said plurality of junction modules for receiving cells from said top and said bottom input buses, queuing said cells and outputting said cells onto said left and said right output buses;

a plurality of output modules wherein each output module is associated with a single column of said matrix, each said output module coupled to all said junction modules within a column to form a fabric column, said output module for managing the transmission of said cells from each said junction module onto said left and said right output buses;

said first port interface module coupled to said left output bus, said second port interface module coupled to said right output bus, each said pair of port interface modules coupled to one of said output modules, said plurality of pairs of port interface modules for interfacing said switching fabric to said network transmission equipment; and wherein N is a positive integer.

2. The switching fabric of claim 1, wherein each said port interface module includes a plurality of port interface controllers for managing said port interface module.

3. The switching fabric of claim 2, wherein each said port interface controller is coupled to a memory store.

4. The switching fabric of claim 1, wherein each said junction module includes a junction controller coupled to said top and said bottom input buses, left and right output buses and said output module via a dedicated control signal line, said junction controller for managing said junction module.

5. The switching fabric of claim 4, wherein each said junction controller is coupled to a plurality of cell buffers, said plurality of cell buffers for temporarily storing said cells while said cells await transmission onto said left and said right output buses.

6. The switching fabric of claim 1 wherein each said output module includes an output controller coupled to each said junction module within said fabric column via a left common bus, a right common bus and a dedicated control signal line, said output controller coupled to said first port interface module via left interface lines and a left output control line, said output controller coupled to said second port interface module via right interface lines and a right output control line, said output controller for managing said output module.

7. The switching fabric of claim 6, wherein each said output module includes a memory store coupled to said output controller.

8. An asynchronous transfer mode switching fabric, comprising:

N port interface circuit cards wherein each port interface card includes a first and second port interface module, said first and said second port interface module for interfacing said switching fabric to and from network transmission equipment;

N fabric circuit cards wherein each said fabric circuit card includes N junction modules coupled to an output module, said output module for managing the transfer of cells into and out of said N junction modules;

a redundant fabric circuit card coupled to said N port interface circuit cards and said N fabric circuit cards, said redundant fabric circuit card operative upon the failure of one of said N fabric circuit cards; and wherein N is a positive integer.

9. The switching fabric of claim 8, wherein each said first and second port interface modules includes a plurality of port interface controllers for coupling said switching fabric to said network transmission equipment.

10. The switching fabric of claim 9, wherein each said port interface controller is coupled to a memory store.

11. The switching fabric of claim 8, wherein each said junction module includes a junction controller coupled to a top and a bottom input bus and a left and a right output bus, said junction controller also coupled to said output module via a dedicated control signal line, said junction controller for managing the transfer of said cells from said top and said bottom input buses to said left and said right output buses.

12. The switching fabric of claim 11, wherein each said junction controller is coupled to a plurality of cell buffers, said plurality of cell buffers for temporarily storing said cells while said cells await transmission onto said left and said right output buses.

13. The switching fabric of claim 8, wherein, on each of said N fabric cards, each said output module includes an output controller coupled to each said junction module within said fabric circuit card via a left common bus, a right common bus and a dedicated control signal line, said output controller coupled to said first port interface module via left interface lines and a left output control line, said output controller coupled to said second port interface module via right interface lines and a right output control line, said output controller for scheduling the transmission of said cells from each said junction module to said first and said second port interface modules.

14. The switching fabric of claim 13, wherein each said output module includes a memory store coupled to said output controller.

15. The switching fabric of claim 8, wherein said redundant fabric circuit card and said N fabric circuit cards include a plurality of electrical terminals and multiplexors, said multiplexors coupled to said electrical terminals and for switching said redundant fabric circuit card into an operative state in the event one of said N fabric circuit cards fails.

16. An asynchronous transfer mode switching fabric, comprising:

a plurality of pairs of port interface modules wherein each said pair of port interface modules includes a first and second port interface module, said first port interface module coupled to a top input bus, said second port interface module coupled to a bottom input bus, said plurality of pairs of port interface modules for coupling network transmission equipment to said switching fabric;

a plurality of junction modules arranged as a matrix of N rows by N columns wherein each junction module within each row is coupled to said top input bus and said bottom input bus, each row associated with one of said pairs of port interface modules, each junction module within each column coupled to a left output bus and a right output bus, said plurality of junction modules for receiving cells from said top and said bottom input buses, queuing said cells and outputting said cells onto said left and said right output buses;

a plurality of output modules wherein each output module is associated with a single column, each said output module coupled to all said junction modules within a column to form a fabric column, said output module for managing the transmission of said cells from each said junction module onto said left and said right output buses;

said first port interface module coupled to said left output bus, said second port interface module coupled to said right output bus, each said pair of port interface modules coupled to one of said output modules, said plurality of pairs of port interface modules for interfacing said switching fabric to said network transmission equipment;

a redundant fabric column coupled to said plurality of pairs of port interface modules and said fabric columns, said redundant fabric column becoming operative upon the failure of one of said fabric columns; and wherein N is a positive integer.

17. The switching fabric of claim 16, wherein each said port interface module includes a plurality of port interface controllers for managing said port interface module.

18. The switching fabric of claim 17, wherein each said port interface controller is coupled to a memory store.

19. The switching fabric of claim 16, wherein each said junction module includes a junction controller coupled to said top and said bottom input buses, left and right output buses and said output module via a dedicated control signal line, said junction controller for managing said junction module.

20. The switching fabric of claim 19, wherein each said junction controller is coupled to a plurality of cell buffers, said plurality of cell buffers for temporarily storing said cells while said cells await transmission onto said left and said right output buses.

21. The switching fabric of claim 16, wherein each said output module includes an output controller coupled to each said junction module, within said fabric column, and said redundant fabric column via a left common bus, a right common bus and a dedicated control signal line, said output controller coupled to said first port interface module via left interface lines and a left output control line, said output controller coupled to said second port interface module via right interface lines and a right output control line, said output controller for managing said output module.

22. The switching fabric of claim 21, wherein each said output module includes a memory store coupled to said output controller.

23. An asynchronous transfer mode switching fabric, comprising:

a group of M input buses;

a group of M output buses;

a plurality of groups of port interface modules wherein each said group of port interface modules includes M port interface modules, said group of port interface modules coupled to said group of M input buses, each $i^{th}$ port interface module within said group of port interface modules coupled to an $i^{th}$ input bus within said group of M input buses, said plurality of groups of port interface modules for coupling network transmission equipment to said switch fabric;

a plurality of junction modules arranged as a matrix of N rows by N columns wherein each junction module within each row is coupled to one of said groups of M input buses, each row associated with one of said groups of M port interface modules, each junction module within each column coupled to one of said groups of M output buses, said plurality of junction modules for receiving cells from said group of M input buses, queuing said cells and outputting said cells onto said group of M output buses;

a plurality of output modules wherein each output module is associated with a single column of said matrix, each said output module coupled to all said junction modules within a column to form a fabric column, said output module for managing the transmission of said cells from each said junction module onto said group of M output buses;

said $i^{th}$ port interface module coupled to an $i^{th}$ output bus, each said group of M port interface modules coupled to one of said output modules, said plurality of groups of port interface modules for interfacing said switching fabric to said network transmission equipment; and wherein M and N are positive integers.

24. An asynchronous transfer mode switching fabric, comprising:

a group of M input buses;

a group of M output buses;

N port interface circuit cards wherein each port interface circuit card includes M port interface modules, each $i^{th}$ port interface module coupled to an $i^{th}$ input bus and an $i^{th}$ output bus, said M port interface modules for interfacing said switching fabric to and from network transmission equipment;

N fabric circuit cards wherein each said fabric circuit card includes N junction modules coupled to an output module, each said junction module forming an intersection comprising one of said N junction modules coupled to said M input and said M output buses of one of said N port interface circuit cards, said output module for managing the transfer of cells into and out of said N junction modules;

a redundant fabric circuit card coupled to said N port interface circuit cards and said N fabric circuit cards, said redundant fabric circuit card operative upon the failure of one of said N fabric circuit cards; and wherein M and N are positive integers.

25. The switching fabric of claim 24, wherein said redundant fabric circuit card and said N fabric circuit cards include a plurality of electrical terminals and multiplexors, said multiplexors coupled to said electrical terminals and for switching said redundant fabric circuit card into an operative state in the event one of said N fabric circuit cards fails.

\* \* \* \* \*